(12) United States Patent
Li et al.

(10) Patent No.: US 8,494,540 B2
(45) Date of Patent: Jul. 23, 2013

(54) METHODS AND APPARATUS FOR CHANNEL SELECTION IN A PEER TO PEER NETWORK

(75) Inventors: Junyi Li, Chester, NJ (US); Saurabh Tavildar, Jersey City, NJ (US); Aleksandar Jovicic, Jersey City, NJ (US); Hongseok Kim, Chatham, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 469 days.

(21) Appl. No.: 12/756,675

(22) Filed: Apr. 8, 2010

(65) Prior Publication Data
US 2011/0249631 A1    Oct. 13, 2011

(51) Int. Cl.
*H04W 24/00* (2009.01)

(52) U.S. Cl.
USPC ........ 455/452.2; 455/453; 455/434; 455/437; 455/455; 455/515; 455/450; 455/464; 455/502; 455/166.2; 455/179.1; 370/329; 370/331; 370/341; 370/431; 370/468

(58) Field of Classification Search
USPC .............. 455/452.2, 453, 434, 437, 455, 515, 455/450, 464, 502, 166.2, 179.1; 370/329, 370/331, 341, 431, 468
See application file for complete search history.

(56) References Cited

U.S. PATENT DOCUMENTS

| 2007/0070937 | A1 | 3/2007 | Demirhan et al. |
| 2008/0144524 | A1* | 6/2008 | Hershey et al. ............... 370/254 |
| 2009/0092084 | A1 | 4/2009 | Kim et al. |
| 2011/0250916 | A1* | 10/2011 | Li et al. .......................... 455/509 |

FOREIGN PATENT DOCUMENTS

| WO | WO2004049631 A1 | 6/2004 |
| WO | WO2005011203 A1 | 2/2005 |
| WO | WO2006016330 A1 | 2/2006 |
| WO | WO2008042536 A2 | 4/2008 |
| WO | WO2010096029 A1 | 8/2010 |

OTHER PUBLICATIONS

International Search Report and Written Opinion—PCT/US2011/031838, International Search Authority—European Patent Office—Sep. 9, 2011.
Partial International Search Report—PCT/US2011/031838—International Search Authority European Patent Office Jul. 22, 2011.

(Continued)

*Primary Examiner* — Nimesh Patel
(74) *Attorney, Agent, or Firm* — Paul S. Holdaway

(57) ABSTRACT

Various embodiments relate to using available spectrum for peer to peer communications and for selecting which of several possibly available channels should be used. Various methods and apparatus are well suited to peer to peer networks in which channel usage decisions are made in a decentralized manner. A wireless terminal generates a list of potential available channels to be used for peer to peer communications, e.g., based on FCC information and/or local sensing. Channels are filled in accordance with a predetermined channel ordering. A wireless terminal migrates between the channels in accordance with changes in the number of peer devices using a channel. The network, in a distributed manner, changes the number of channels in use at a location in response to changes in numbers of active peer devices at a location.

27 Claims, 22 Drawing Sheets

OTHER PUBLICATIONS

Federal Communication Commision (FCC 08-260), Second Report and Order and Memorandum Opinion and Order, Awdopted Nov. 4, 2008 and Releases Nov. 14, 2008, Washington D.C., 130 Pages.

Federal Communication Commision, Proposal by Google Inc., to provide a TV Band Device Database Management Solution, Jan. 4, 2010, Washington D.C., 18 pages.

* cited by examiner

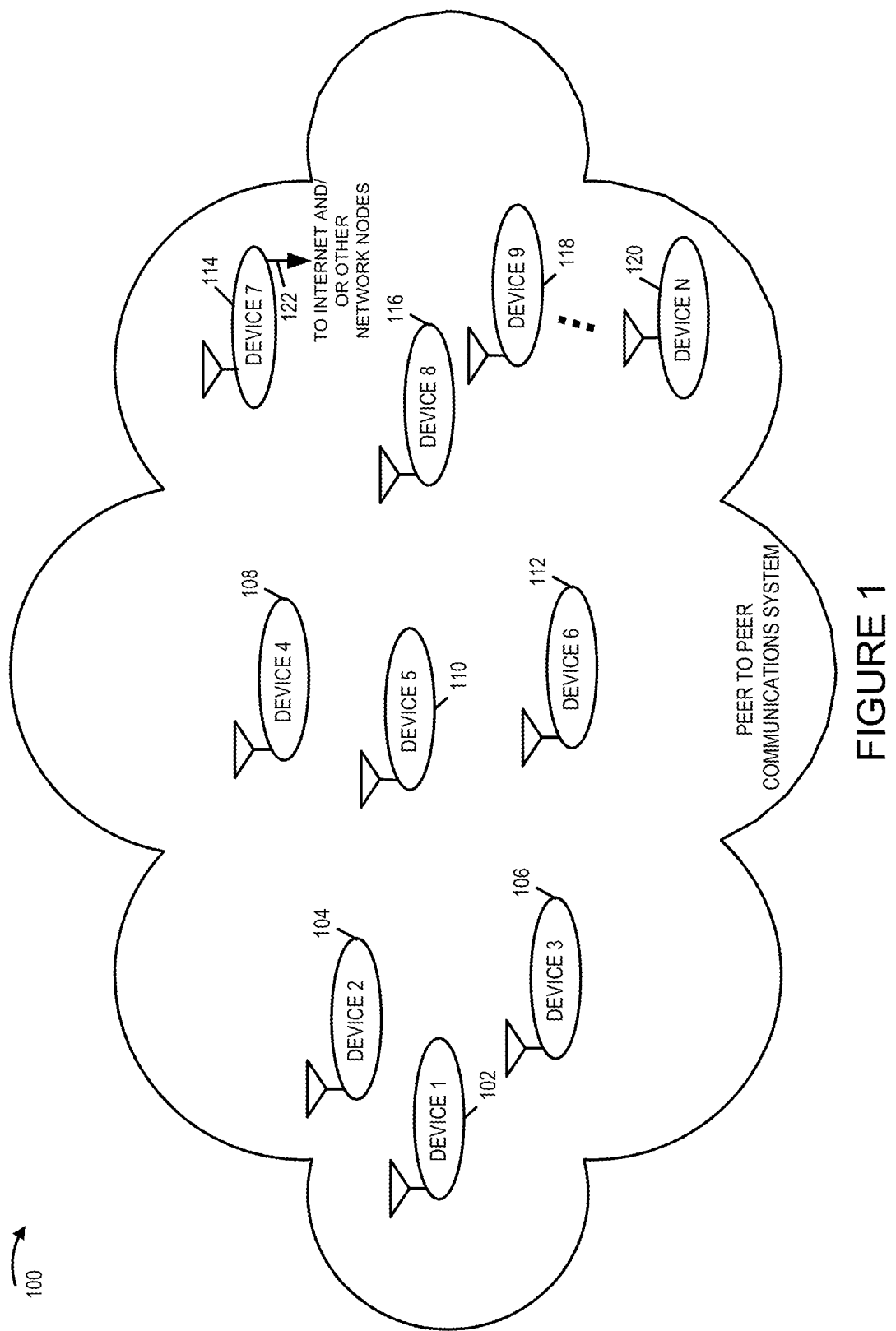

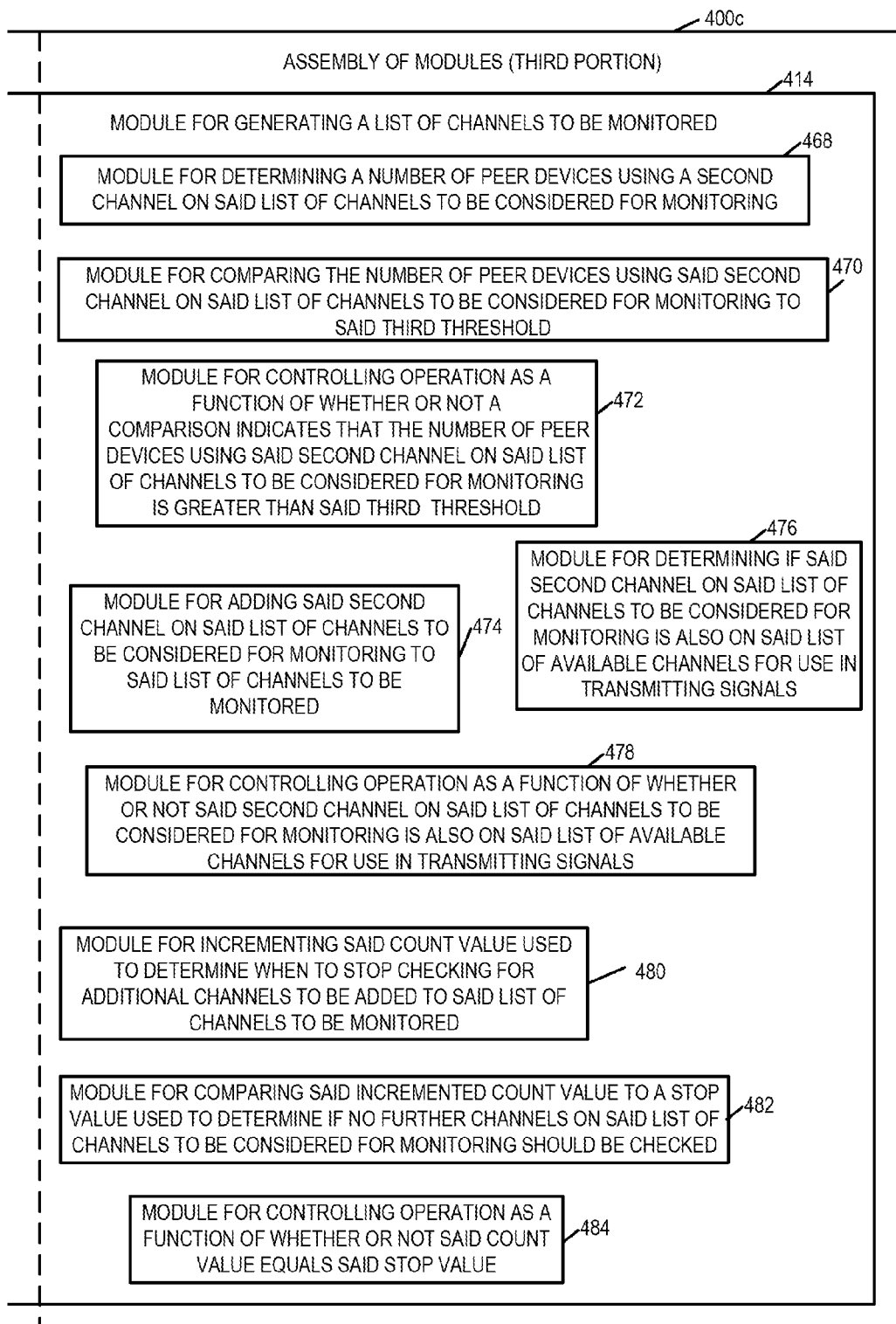

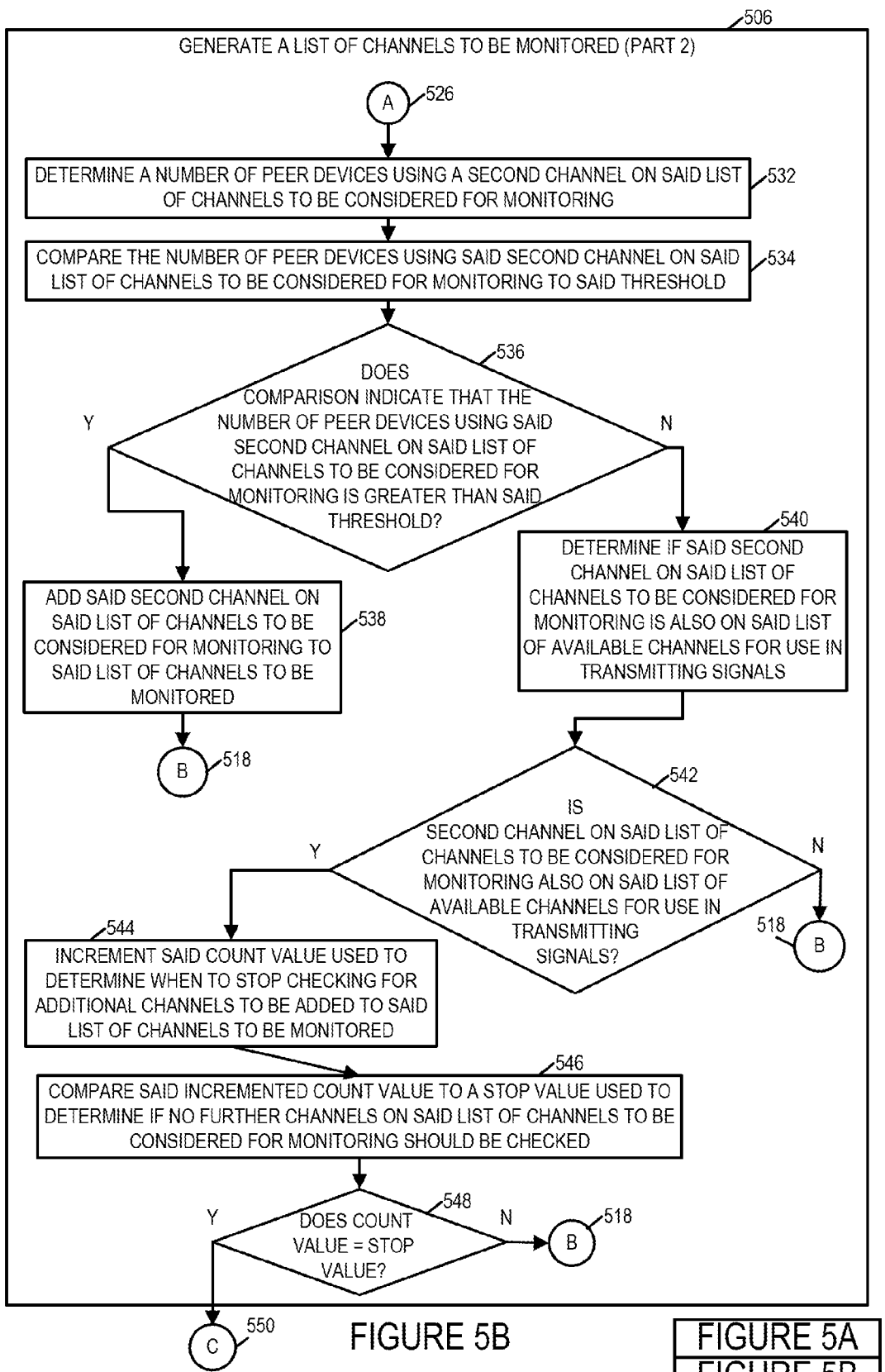

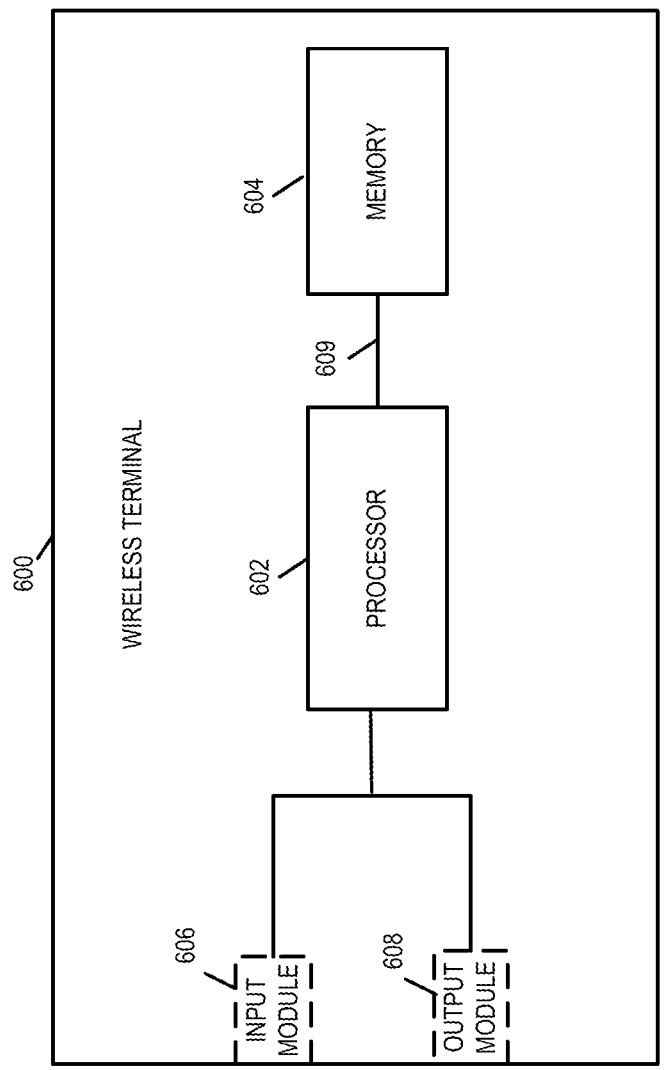

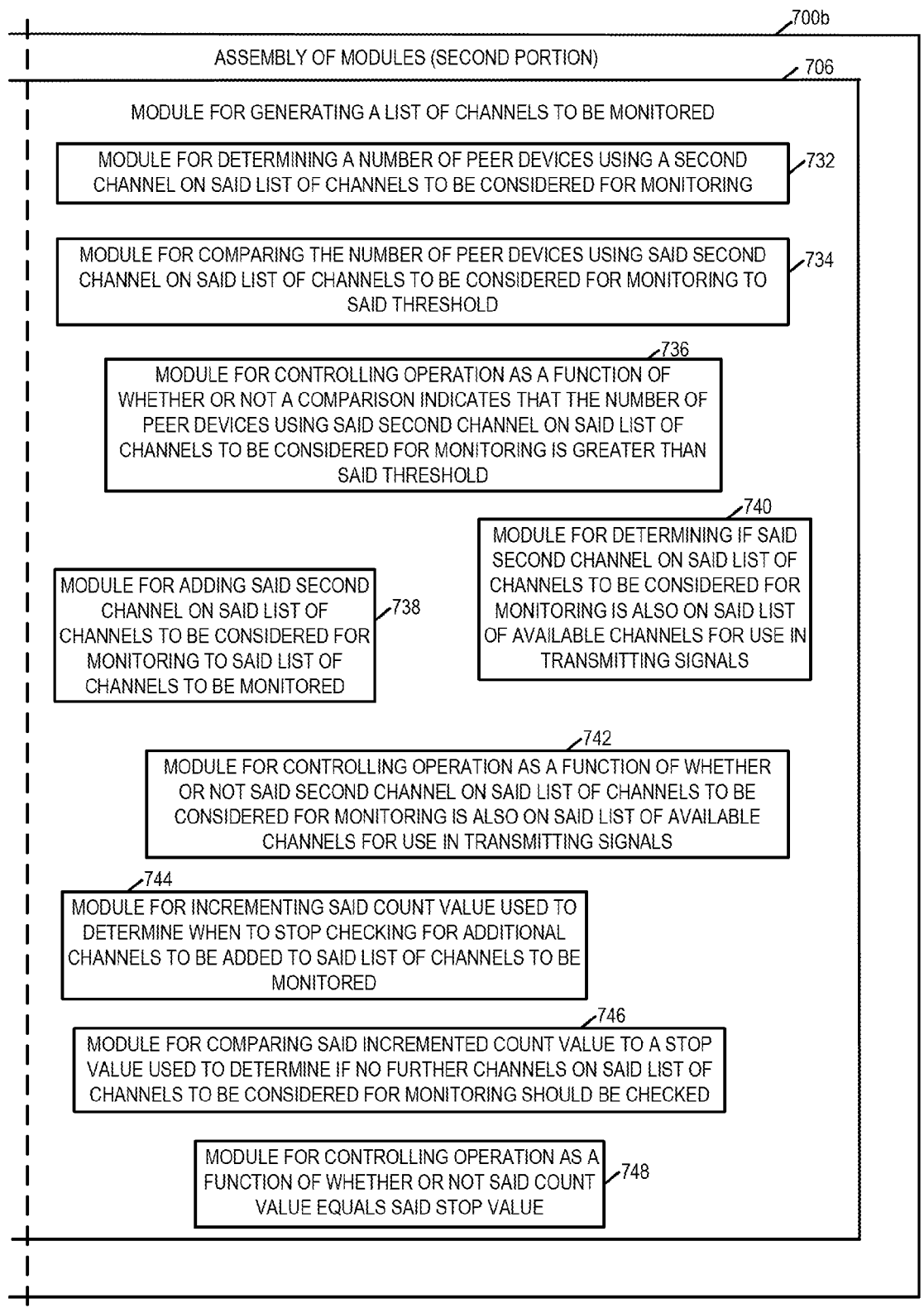

METHODS AND APPARATUS FOR CHANNEL SELECTION IN A PEER TO PEER NETWORK

FIELD

Various embodiments relate to wireless communications, and more particularly, to methods and apparatus for deciding which channel or channels to use for peer to peer signaling.

BACKGROUND

Recently, the FCC has allowed the use of unused spectrum, e.g., unused TV spectrum, in accordance with rules for accessing the spectrum. One application for the potential use of such newly available spectrum, e.g., available white space, is for peer to peer communications. To support peer to peer communications it is desirable that peers be able to discover the presence of one another. At a particular location, there may be a relatively large amount of white space available for potential peer to peer communications, e.g. many channels may be available with each channel corresponding to particular frequency band.

For efficient wireless terminal operation, it is desirable that peer devices operate in relatively few channels, e.g., so as to limit the amount of search time required and/or power consumption used for searching purposes. However, if too many wireless terminals try to use a single channel, the channel may become overloaded limiting peer to peer communications. In addition, as conditions may change over time, at a particular location different numbers of peer devices may wish to be supported at different times and/or devices using a channel may leave the area.

In some peer to peer wireless communications systems, there is no central device which controls and directs peer to peer operations, and which could manage and regulate the use of available spectrum. In some such networks, decisions are made in a decentralized fashion.

Based on the above discussion, it should be appreciated that there is a need for methods and apparatus which support decentralized decision making regarding the use of available white space for peer to peer communications.

SUMMARY OF THE INVENTION

Various embodiments, relate to wireless communications, and more particularly, to the use of available spectrum, e.g., white space spectrum, for peer to peer communications. Various methods and apparatus are well suited to peer to peer networks in which channel usage decisions are made in a decentralized manner. In some embodiments, a wireless terminal generates a list of potential available channels to be used for peer to peer communications, e.g., based on FCC information and/or local sensing. There is a predetermined ordering to the channels, which is known to the wireless terminals in the network, and the predetermined ordering is used by the wireless terminals in making channel usage decisions.

Various exemplary methods tend to fill the channels in accordance with a predetermined sequence. Thus, at a time of low activity one or a few channels are used. However, at a time of high activity many channels are used. A wireless terminal migrates between the channels in accordance with changes in the number of peer devices it is currently detecting at a location, e.g., based on counts of detected peer discovery signals from other peer devices. Thus, the network, in a distributed manner, adapts to the changing conditions, changing the number of channels in use in response to changes in the number of peer devices which are active at a location. This feature of dynamically adapting to changing conditions to vary the number of channels in use at a particular time can facilitate efficient use of the white space, efficient peer discovery operations and/or conservation of battery power.

An exemplary method of operating a wireless terminal, in accordance with some embodiments, comprises: generating a list of available channels for use in transmitting signals, said list of available channels including a first channel in a sequence of channels; determining a number of peer devices using said first channel; comparing the number of peer devices using said first channel to a first threshold; and when said comparing indicates that the number of peer devices using the first channel is less than or equal to said first threshold, using said first channel for transmission purposes. An exemplary wireless terminal, in accordance with some embodiments, comprises: at least one processor configured to: generate a list of available channels for use in transmitting signals, said list of available channels including a first channel in a sequence of channels; determine a number of peer devices using said first channel; compare the number of peer devices using said first channel to a first threshold; and use said first channel for transmission purposes when said comparing indicates that the number of peer devices using the first channel is less than or equal to said first threshold. The exemplary wireless terminal further comprises memory coupled to said at least one processor.

An exemplary method of operating a wireless terminal, in accordance with some embodiments, comprises: generating a list of channels to be considered for monitoring, generating a list of channels to be monitored and monitoring channels on said list of channels to be monitored. In some embodiments, generating a list of channels to be monitored includes determining for a first channel on said list of channels to be considered for monitoring, a number of devices using said first channel on said list of channels to be considered for monitoring. An exemplary wireless terminal, in accordance with some embodiments, comprises: at least one processor configured to: generate a list of channels to be considered for monitoring, generate a list of channels to be monitored, and monitor channels on said list of channels to be monitored. The exemplary wireless terminal further comprises memory coupled to said at least one processor. In some embodiments the at least one processor is further configured to determine for a first channel on said list of channels to be considered for monitoring, a number of devices using said first channel on said list of channels to be considered for monitoring, as part of being configured to generate a list of channels to be monitored.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 1 is a drawing of an exemplary wireless peer to peer communications system in accordance with an exemplary embodiment.

FIG. 4C is a third portion of an assembly of modules which can, and in some embodiments is, used in the wireless terminal illustrated in FIG. 3.

FIG. 5B is a second part of a flowchart of an exemplary method of operating a wireless terminal in accordance with various exemplary embodiments.

FIG. 6 is a drawing of an exemplary wireless terminal, in accordance with an exemplary embodiment.

FIG. 7B is a second portion of an assembly of modules which can, and in some embodiments is, used in the wireless terminal illustrated in FIG. 6.

DETAILED DESCRIPTION

Figure 2C:
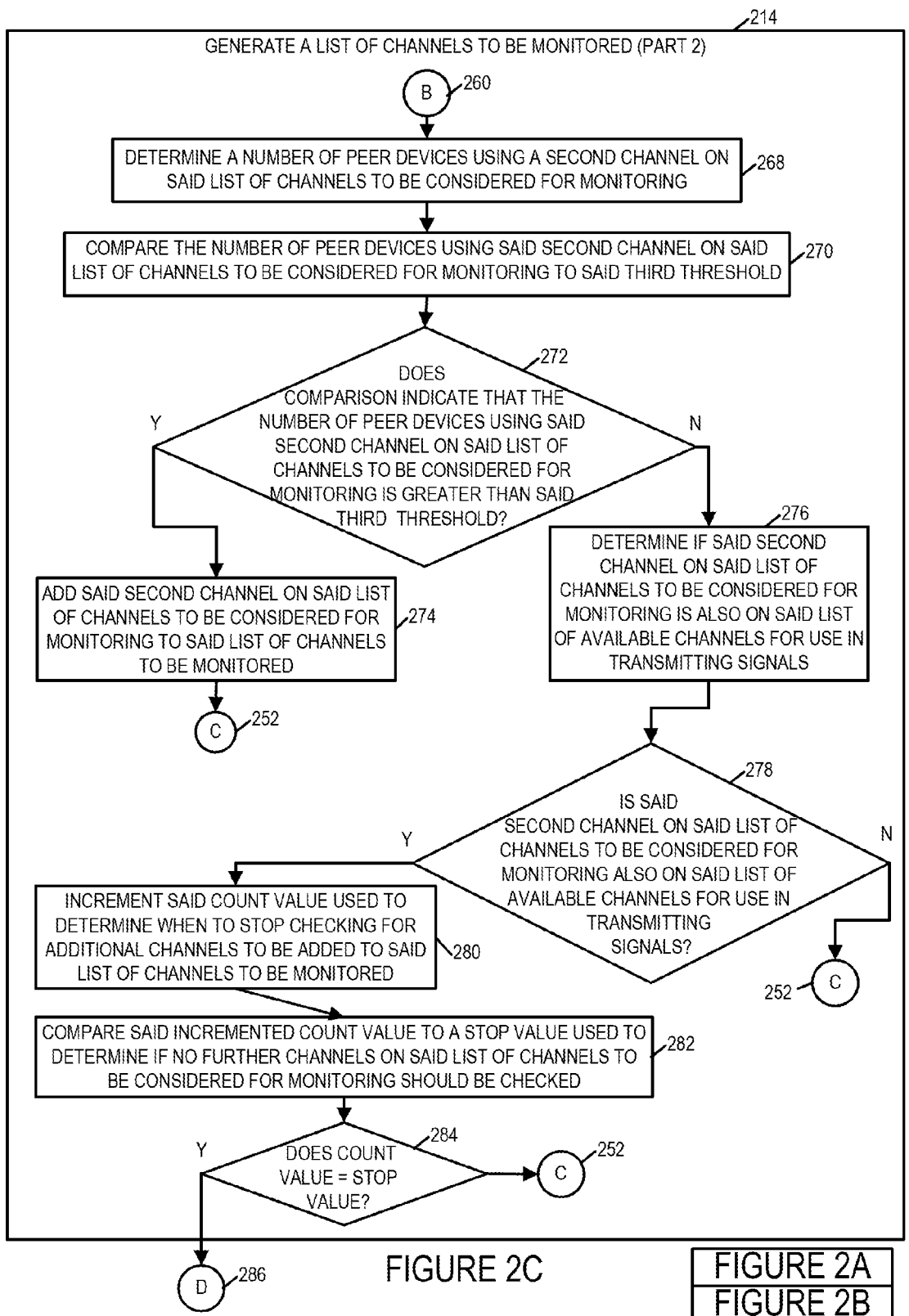
FIG. 2C is a third part of a flowchart of an exemplary method of operating a wireless terminal in accordance with various exemplary embodiments.

FIG. 1 is a drawing of an exemplary wireless peer to peer communications system 100 in accordance with an exemplary embodiment. Exemplary wireless peer to peer communications system 100 includes a plurality of wireless communications devices (device 1 102, device 2 104, device 3 106, device 4 108, device 5 110, device 6 112, device 7 114, device 8 116, device 9 118, . . . , device N 120. Some of the wireless communications devices in system 100, e.g., device 7 114, include an interface 122, to the Internet and/or other network nodes. Some of the wireless communications devices in system 100, e.g., device 1 102, device 2 104, device 3 106, device 4 108, device 5 110, device 6 112, device 8 116, device 9 118 and device N 120, are mobile wireless communications devices, e.g., handheld mobile devices.

The wireless communications devices in system 100 are, e.g., wireless terminals, supporting direct peer to peer communications. In different locations different channels may be available for use, e.g., as a function of available white space. Wireless communications devices, e.g., wireless terminals, generate lists of channels to use for transmission and/or lists of channels to use for monitoring, with regard to peer to peer signaling. In some embodiments, the exemplary wireless terminals support both peer to peer signaling and cellular signaling. In some such embodiments, the wireless terminals may also be included as part of a cellular wireless communications system including one or more base stations. In various embodiments, the base stations are coupled to a server node, e.g., a server node including channel availability information corresponding to different locations, the channel availability information in accordance with FCC frequency spectrum licensing and FCC information identifying white space which is available for peer to peer signaling usage.

Figure 2A:
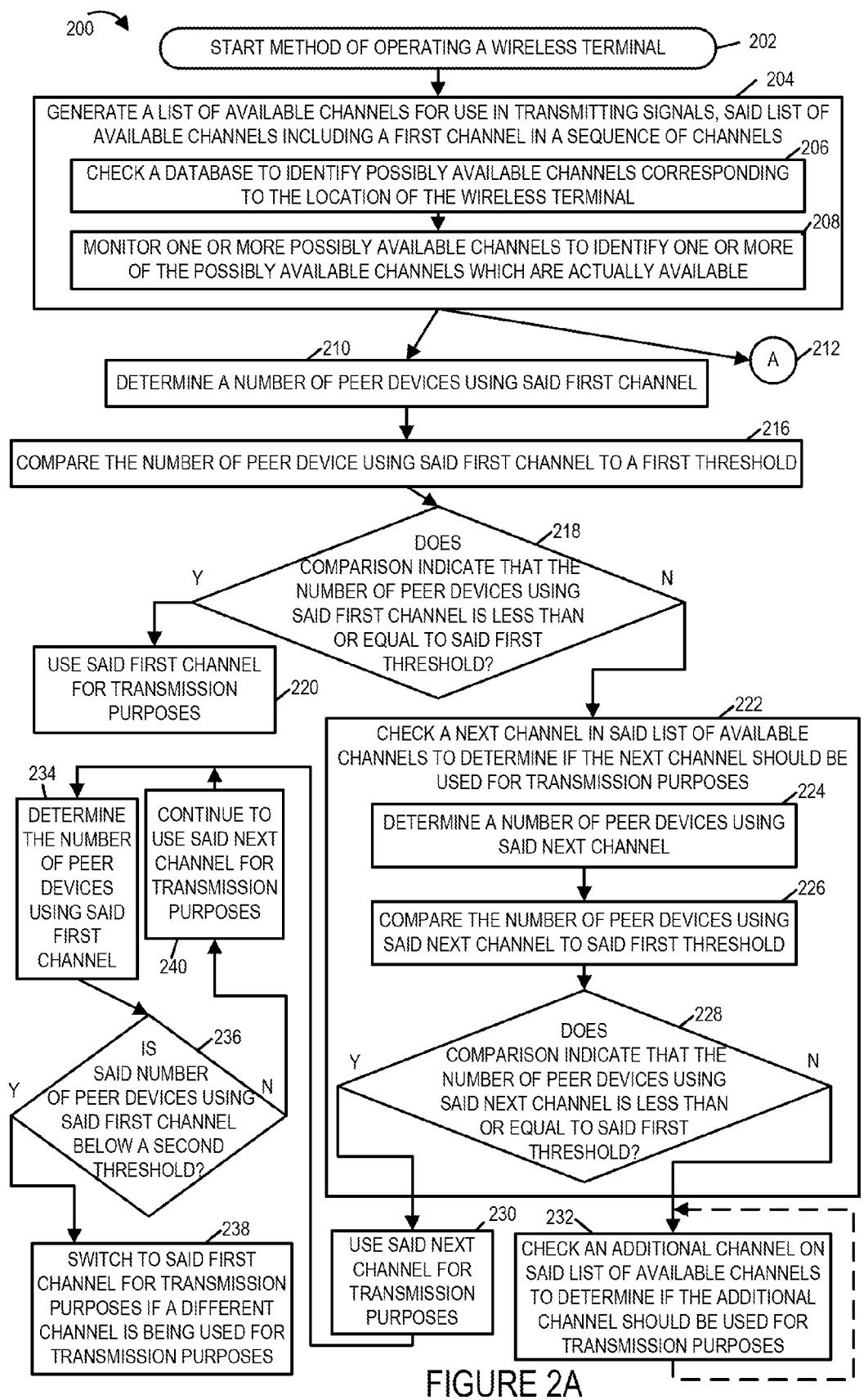
FIG. 2A is a first part of a flowchart of an exemplary method of operating a wireless terminal in accordance with various exemplary embodiments.
Figure 2B:
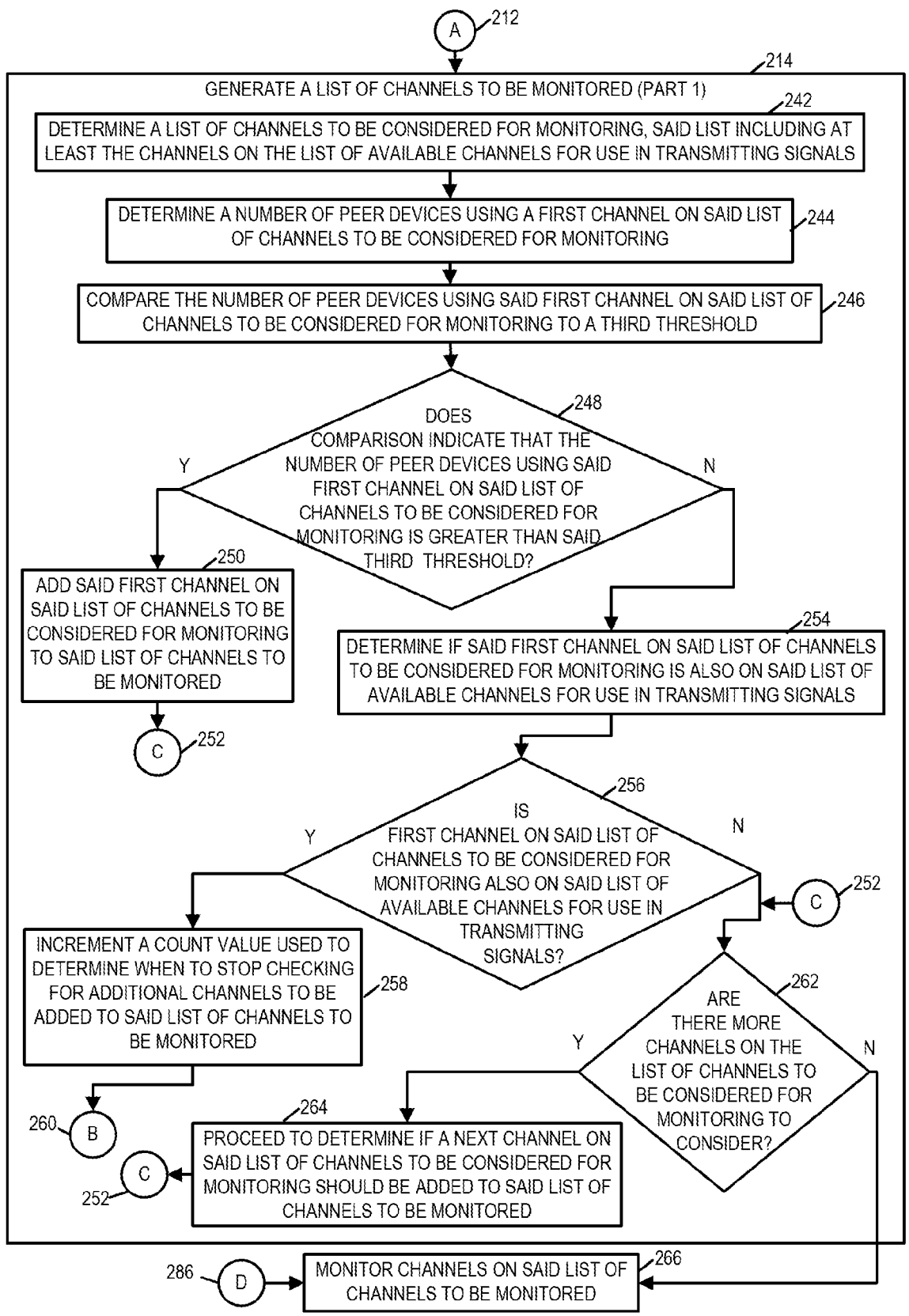
FIG. 2B is a second part of a flowchart of an exemplary method of operating a wireless terminal in accordance with various exemplary embodiments.

FIG. 2, comprising the combination of FIG. 2A, FIG. 2B and FIG. 2C, is a flowchart 200 of an exemplary method of operating a wireless terminal in accordance with an exemplary embodiment. The wireless terminal is, e.g., one of the wireless communications devices of FIG. 1. Operation starts in step 202, where the wireless terminal is powered on and initialized. Operation proceeds from start step 202 to step 204. In step 204, the wireless terminal generates a list of available channels for use in transmitting signals, said list of available channel including a first channel in a sequence of channels. Step 204 includes steps 206 and 208. In step 206 the wireless terminal checks a database to identify possibly available channels corresponding to the location of the wireless terminal, and in step 208 the wireless terminal monitors one or more possibly available channels to identify one or more of the possibly available channels which are actually available. Operation proceeds from step 204 to step 210 and to step 214, via connecting node A 212.

In step 210 the wireless terminal determines a number of peer devices using said first channel. Then in step 216 the wireless terminal compares the number of peer devices using said first channel to a first threshold. Operation proceeds from step 216 to step 218. In step 218, if the comparison of step 216 indicates that the number of peer devices using said first channel is less than or equal to said first threshold, then operation proceeds from step 218 to step 220, in which the wireless terminal uses said first channel for transmission purposes; otherwise, operation proceeds from step 218 to step 222.

Returning to step 222, in step 222 the wireless terminal checks a next channel in said list of available channels to determine if the next channel should be used for transmission purposes. Step 222 includes steps 224, 226 and 228. In step 224 the wireless terminal determines a number of peer devices using the next channel, and then in step 226 the wireless terminal compares the number of peer devices using said next channel to said first threshold. Operation proceeds from step 226 to step 228. In step 228, if the comparison of step 226 indicates that the number of peer devices using said next channel is less than or equal to said first threshold, then operation proceeds from step 228 to step 230; otherwise, operation proceeds from step 228 to step 232, in which the wireless terminal checks an additional channel on said list of available channels to determine if the additional channel should be used for transmission purposes. In various embodiments, step 232 may be, and sometimes is, repeated for more than one additional channel. For example, in some embodiments, if the check of step 232 does not indicate that the additional channel being checked should be used for transmission purposes, step 232 is repeated for another additional channel on the list of available channels, provided there is another additional channel on the list of available channels. This may happen multiple times with multiple additional channels being checked.

Returning to step 230, in step 230 the wireless terminal uses said next channel for transmission purposes. Operation proceeds from step 230 to step 234, in which the wireless terminal determines the number of peer devices using said first channel. Operation proceeds from step 234 to step 236. In step 236, the wireless terminal compares the determined number of peer devices using said first channel from step 234 to a second threshold. If the determined number of peer devices using said first channel is below a second threshold, then operation proceeds from step 236 to step 238, where the wireless terminal switches to said first channel for transmission purposes if a different channel is being used for transmission purposes; otherwise operation proceeds from step 236 to step 240. In step 240 the wireless terminal continues to use said next channel for transmission purposes. Operation proceeds from step 240 to step 234, where the wireless terminal again determines the number of devices using said first channel.

Returning to step 214, in step 214 the wireless terminal generates a list of channels to be monitored. Step 214 includes steps 242, 244, 246, 248, 250, 254, 256, 258, 262, 264, 268, 270, 272, 274, 276, 278, 280, 282 and 284.

In step 242, the wireless terminal determines a list of channels to be considered for monitoring, said list including at least the channels on the list of available channel for use in transmitting signals. Then, in step 244, the wireless terminal determines a number of peer devices using a first channel on said list of channels to be considered for monitoring. Operation proceeds from step 244 to step 246, in which the wireless terminal compares the determined number of peer devices using said first channel on said list of channels to be considered for monitoring to a third threshold. Operation proceeds from step 246 to step 248.

In step 248, if the comparison of step 246 indicates that the number of peer devices using said first channel on said list of channels to be considered for monitoring is greater than said third threshold, then operation proceeds from step 248 to step 250; otherwise operation proceeds from step 248 to step 254.

In step 254, the wireless terminal determines if said first channel on said list of channels to be considered for monitoring is also on said list of available channels for use in transmitting signals. Operation proceeds from step 254 to step 256.

In step 256, if the determination of step 254 indicates that said first channel on said list of channels to be considered for monitoring is also on said list of available channels for use in transmitting signals, then operation proceeds from step 256 to step 258; otherwise operation proceeds from step 256 to step 262. In step 262 the wireless terminal checks as to whether or not there are more channels on said list of channels to be considered for monitoring to consider. If there are not more channels on said list of channels to be considered for monitoring to consider, then operation proceeds from step 262 to step 266, where the wireless terminal monitors channels on said list of channels to be monitored; otherwise, operation proceeds from step 262 to step 264, in which the wireless terminal proceeds to determine if a next channel on said list of channels to be considered for monitoring should be added to said list of channels to be monitored, e.g., without including said first channel on said list of channels to be monitored. Operation proceeds from step 264, via connecting node C 252 to step 262.

Returning to step 250, in step 250 the wireless terminal adds said first channel on said list of channels to be considered for monitoring to said list of channels to be monitored. Operation proceeds from step 250, via connecting node C 252 to step 262.

Returning to step 258, in step 258 the wireless terminal increments a count value to be used to determine when to stop checking for additional channels to be added to said list of available channels to be monitored. Operation proceeds from step 258, via connecting node B 260, to step 268. In step 268 the wireless terminal determines a number of peer devices using a second channel on said list of channels to be considered for monitoring. Then, in step 270 the wireless terminal compares the number of peer devices using said second channel on said list of channels to be considered for monitoring to said third threshold. Operation proceeds from step 270 to step 272.

In step 272, if the comparison of step 270 indicates that the number of peer devices using said second channel on said list of channels to be considered for monitoring is greater than said third threshold, then operation proceeds from step 272 to step 274; otherwise operation proceeds from step 272 to step 276.

Returning to step 274, in step 274 the wireless terminal adds said second channel on said list of channels to be considered for monitoring to said list of channels to be monitored. Operation proceeds from step 274, via connecting node C 252 to step 262.

Returning to step 276, in step 276 the wireless terminal determines if said second channel on said list of channels to be considered for monitoring is also on said list of available channels for use in transmitting signals. Operation proceeds from step 276 to step 278. In step 278, if the determination of step 276 is that the second channel on said list of channels to be considered for monitoring is also on said list of available channels for use in transmitting signals, then operation proceeds from step 278 to step 280; otherwise, operation proceeds from step 278, via connecting node C 252 to step 262.

Returning to step 280, in step 280, the wireless terminal increments said count value used to determine when to stop checking for additional channels to be added to said list of channels to be monitored. Operation proceeds from step 280 to step 282, in which the wireless terminal compares the incremented count value to a stop value used to determine if no further channels on said list of channels to be considered for monitoring should be checked. In one exemplary embodiment the stop value equals 2. Operation proceeds from step 282 to step 284. In step 284, if the comparison of step 282 indicates that the count value equals the stop value, then operation proceeds from step 284 via connecting node D 286 to step 266, in which the wireless terminal monitors channels on said list of channels to be monitored. However, in step 284, if the comparison of step 282 indicates the count value does not equal the stop value, then operation proceeds from step 284 via connecting node C 252 to step 262, where the wireless terminal checks if there are more channels on the list of channels to be considered for monitoring to consider.

Figure 3:
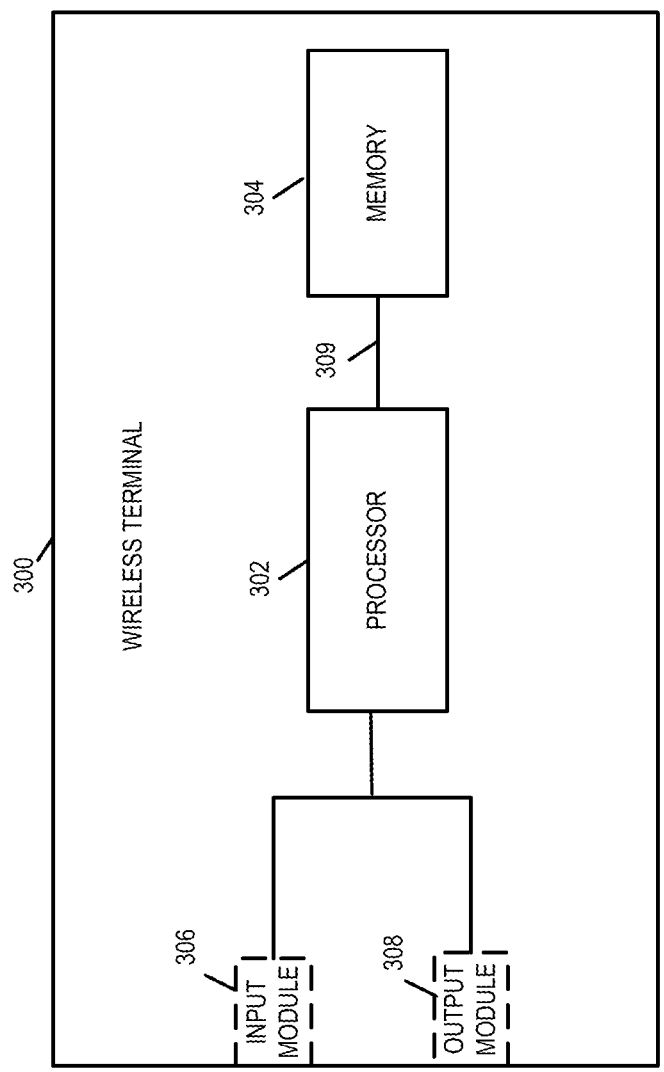
FIG. 3 is a drawing of an exemplary wireless terminal, in accordance with an exemplary embodiment.

FIG. 3 is a drawing of an exemplary wireless terminal 300, in accordance with an exemplary embodiment. Exemplary wireless terminal 300 is, e.g., one of the wireless communications devices of FIG. 1. Exemplary wireless terminal 300 may, and sometimes does, implement a method in accordance with flowchart 200 of FIG. 2. Wireless terminal 300 includes a processor 302 and memory 304 coupled together via a bus 309 over which the various elements (302, 304) may interchange data and information. Wireless terminal 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to generate a list of available channels for use in transmitting signals, said list of available channels including a first channel in a sequence of channels; determine a number of peer devices using said first channel; compare the number of peer devices using said first channel to a first threshold; and use said first channel for transmission purposes when said comparing indicates that the number of peer devices using the first channel is less than or equal to said first threshold. In some embodiments, processor 302 is further configured to: check a next channel on said list of available channels to determine if the next channel should be used for transmission purposes, when said comparing indicates that the number of peer devices using said first channel is greater than said first threshold.

In various embodiments, processor 302 is further configured to: determine a number of peer devices using said next channel; and compare the number of peer devices using said next channel to said first threshold, as part of being configured to check the next channel in said list of available channels. Processor 302, in various embodiments, is further configured to: use said next channel for transmission purposes, when said comparing the number of peer devices using said next channel to said first threshold indicates that the number of peer devices using the next channel is less than or equal to said first threshold.

Processor 302, in some embodiments, is further configured to: check an additional channel on said list of available channels to determine if the additional channel should be used for transmission purposes, when said comparing the number of peer devices using said next channel to said first threshold indicates that the number of peer devices using said first channel is greater than said first threshold. In various embodiments, processor 302 is further configured to: determine the number of devices using said first channel, and switch to said first channel for transmission purposes if a different channel is being used for transmission purposes, if said number of devices using said first channel is below a second threshold.

In some embodiments, processor 302 is further configured to: check a database to identify possibly available channels corresponding to the location of said wireless terminal; and monitor one or more possibly available channels to identify one or more of the possibly available channels which are actually available, as part of being configured to generate a list of available channels for use in transmitting signals.

In various embodiments, processor 302 is further configured to: generate a list of channels to be monitored; and monitor channels on said list of channels to be monitored.

Processor 302, in some embodiments, is further configured to: determine a list of channels to be considered for monitoring, said list including at least the channels on the list of available channels for use in transmitting signals, as part of being configured to generate a list of channels to be monitored. Processor 302, in various embodiments, is further configured to: determine a number of peer devices using a first channel on said list of channels to be considered for monitoring; and compare the number of peer devices using said first channel on said list of channels to be considered for monitoring to a third threshold; and add said first channel on said list of channels to be considered for monitoring to said list of channels to be monitored, when said comparing the number of peer devices using said first channel on said list of channels to be considered for monitoring to a third threshold indicates that the number of peer devices using the first channel on said list of channels to be considered for monitoring is greater than said third threshold, as part of being configured to generate a list of channels to be monitored.

Processor 302, in various embodiments, is further configured to: proceed to determine if a next channel on said list of channels to be considered for monitoring should be added to said list of channels to be monitored without including said first channel on said list of channels to be monitored, when said comparing the number of peer devices using said first channel on said list of channels to be considered for monitoring to a third threshold indicates that the number of peer devices using the first channel on said list of channels to be considered for monitoring is less than or equal to said third threshold, as part of being configured to generate a list of channels to be monitored. Processor 302, in some embodiments, is further configured: determine if said first channel on said list of channels to be considered for monitoring is also on said list of available channels for use in transmitting signals; and increment a count value used to determine when to stop checking for additional channels to be added to said list of channels to be monitored when it is determined that said first channel on said list of channels to be considered for monitoring is also on said list of available channels for use in transmitting signals, when said comparing the number of peer devices using said first channel on said list of channels to be considered for monitoring to a third threshold indicates that the number of peer devices using the first channel on said list of channels to be considered for monitoring is less than or equal to said third threshold, as part of being configured to generate a list of channels to be monitored.

In various embodiments, processor 302 is further configured to: determine a number of peer devices using a second channel on said list of channels to be considered for monitoring; and compare the number of peer devices using said second channel on said list of channels to be considered for monitoring to said third threshold; and add said second channel on said list of channels to be considered for monitoring to said list of channels to be monitored, when said comparing indicates that the number of peer devices using the second channel on said list of channels to be considered for monitoring is greater than said third threshold, as part of being configured to generate a list of channels to be monitored. Processor 302 is further configured to: determine if said second channel on said list of channels to be considered for monitoring is also on said list of available channels for use in transmitting signals; and increment said count value used to determine when to stop checking for additional channels to be added to said list of channels to be monitored when it is determined that said second channel on said list of channels to be considered for monitoring is also on said list of available channels for use in transmitting signals; and compare said incremented count value to a stop value used to determine if no further channels on said list of channels to be considered for monitoring should be checked, when said comparing the number of peer devices using said second channel in said list of channels to be considered for monitoring to the third threshold indicates that the number of peer devices using the second channel on said list of channels to be considered for monitoring is less than or equal to said third threshold, as part of being configured to generate a list of channels to be monitored.

Figure 4A:
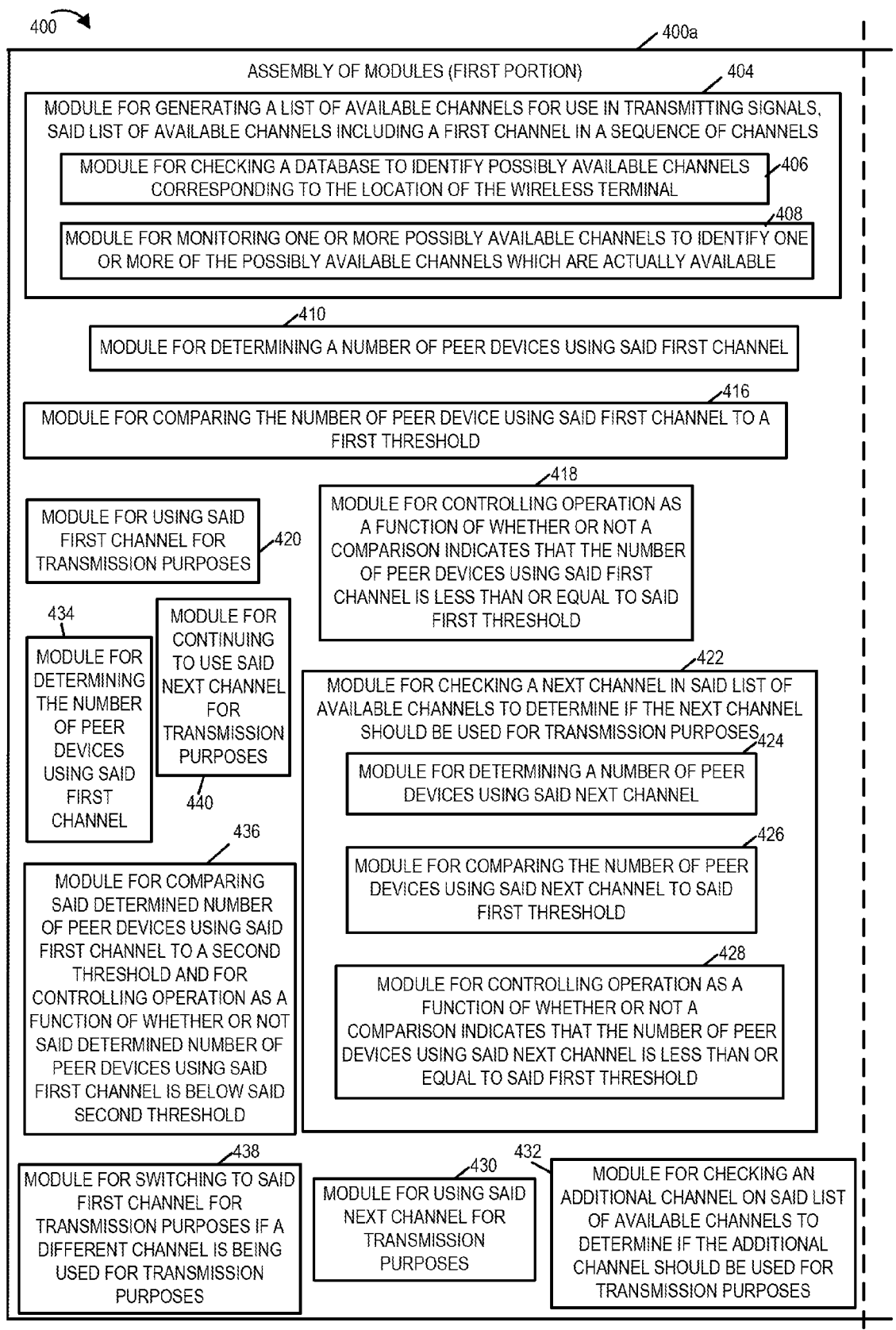
FIG. 4A is a first portion of an assembly of modules which can, and in some embodiments is, used in the wireless terminal illustrated in FIG. 3.
Figure 4B:
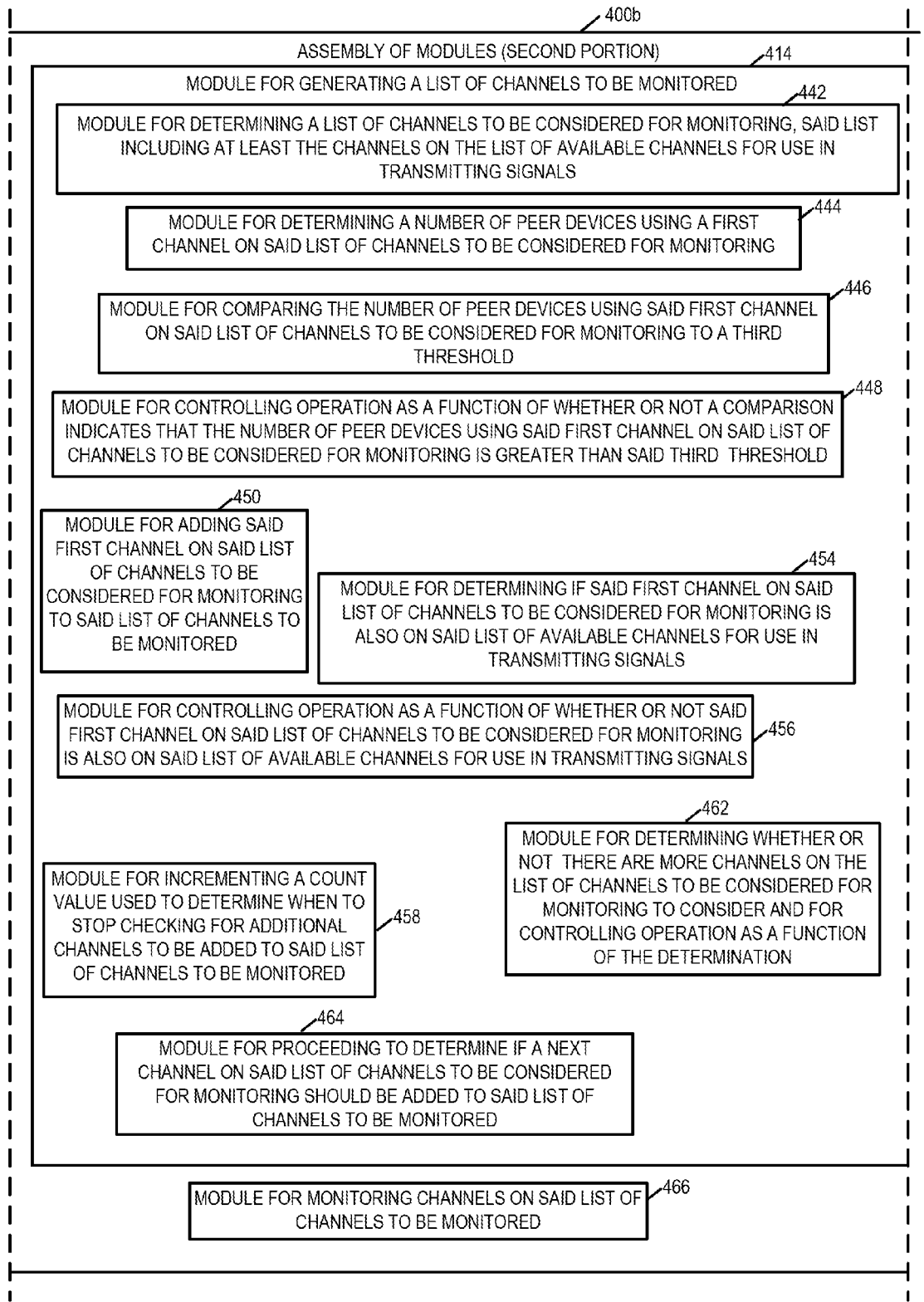
FIG. 4B is a second portion of an assembly of modules which can, and in some embodiments is, used in the wireless terminal illustrated in FIG. 3.

FIG. 4, comprising the combination of FIG. 4A, FIG. 4B and FIG. 4C is an assembly of modules 400 which can, and in some embodiments is, used in the wireless terminal 300 illustrated in FIG. 3. Assembly of modules 400 includes portion 400*a*, portion 400*b* and portion 400*c*. The modules in the assembly 400 can be implemented in hardware within the processor 302 of FIG. 3, e.g., as individual circuits. Alternatively, the modules may be implemented in software and stored in the memory 304 of the wireless terminal 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the wireless terminal 300 or elements therein such as the processor 302, to perform the functions of the corresponding steps illustrated and/or described in the method of flowchart 200 of FIG. 2.

FIG. 4, comprising the combination of FIG. 4A, FIG. 4B and FIG. 4C is an assembly of modules 400 in accordance with an exemplary embodiment. Assembly of modules 400 includes a first portion 400*a*, a second portion 400*b* and a third portion 400*c*.

Assembly of modules 400 includes a module 404 for generating a list of available channels for use in transmitting signals, said list of available channels including a first channel in a sequence of channels, a module 410 for determining a number of peer devices using said first channel, a module 416 for comparing the number of peer devices using said first channel to a first threshold, a module 418 for controlling operation as a function of whether or not a comparison indicates that the number of peer devices using said first channel is less than or equal to said first threshold, a module for using said first channel for transmission purpose, a module 422 for checking a next channel in said list of available channels to determine if the next channel should be used for transmission purposes, a module 430 for using said next channel for transmission purposes, a module 432 for checking an additional channel on said list of available channels to determine if the additional channel should be used for transmission purposes, a module 434 for determining the number of peer devices using said first channel, a module 436 for comparing said determined number of peer devices using said first channel to a second threshold and for controlling operation as a function of whether or not said determined number of peer devices using said first channel is below said second threshold, a module 438 for switching to said first channel for transmission purposes if a different channel is being used for transmission purposes, and a module 440 for continuing to used said next channel for transmission purposes.

Module 404 includes a module 406 for checking a database to identify possibly available channels corresponding to the location of the wireless terminal and a module 408 for monitoring one or more possibly available channels to identify one or more of the possibly available channels which are actually available. Module 422 includes a module 424 for determining a number of peer devices using said next channel, a module 426 for comparing the number of peer devices using said next channel to a first threshold and a module 428 for controlling operation as a function of whether or not a comparison indicates that the number of peer devices using said next channel is less than or equal to said first threshold.

Assembly of modules 400 further includes a module 414 for generating a list of channels to be monitored and a module 466 for monitoring channels on said list of channels to be monitored. Module 414 includes a module 442 for determining a list of channels to be considered for monitoring, said list including at least the channels on the list of available channels for use in transmitting signals, a module 444 for determining a number of peer devices using a first channel on said list of channels to be considered for monitoring, a module 446 for comparing the number of peer devices using said first channel on said list of channels to be considered for monitoring to a third threshold, and a module 448 for controlling operation as a function of whether or not a comparison indicates that the number of peer devices using said first channel on said list of channels to be considered for monitoring is greater than said third threshold.

Module 414 further includes a module 450 for adding said first channel on said list of channels to be considered for monitoring to said list of channels to be monitored, a module 454 for determining if said first channel on said list of channels to be considered for monitoring is also on said list of available channels for use in transmitting signals, a module 456 for controlling operation as a function of whether or not said first channel on said list of channels to be considered for monitoring is also on said list of available channels for use in transmitting signals, a module 458 for incrementing a count value used to determine when to stop checking for additional channels to be added to said list of channels to be monitored, a module 462 for determining whether or not there are more channels on the list of channels to be considered for monitoring to consider and for controlling operation as a function of the determination, and a module 464 for proceeding to determine if a next channel on said list of channels to be considered for monitoring should be added to said list of channels to be monitored, e.g., without including said first channel on said list of channels to be monitored. Module 414 further includes a module 468 for determining a number of peer devices using a second channel on said list of channels to be considered for monitoring, a module 470 for comparing the number of peer devices using said second channel on said list of channels to be considered for monitoring to said third threshold, a module for controlling operation as a function of whether or not a comparison indicates that the number of peer devices using said second channel on said list of channels to be considered for monitoring is greater than said third threshold, a module 474 for adding said second channel on said list of channels to be considered for monitoring to said list of channels to be monitored, a module 476 for determining if said second channel on said list of channels to be considered for monitoring is also on said list of available channels for use in transmitting signals. Module 414 further includes a module 478 for controlling operation as a function of whether or not said second channel on said list of channels to be considered for monitoring is also on said list of available channels for use in transmitting signals, a module 480 for incrementing said count value used to determine when to stop checking for additional channels to be added to said list of channels to be monitored, a module 482 for comparing said incremented count value to a stop value used to determine if no further channels on said list of channels to be considered for monitoring should be checked, and a module 484 for controlling operation as function of whether or not said count value equals said stop value.

Figure 5A:
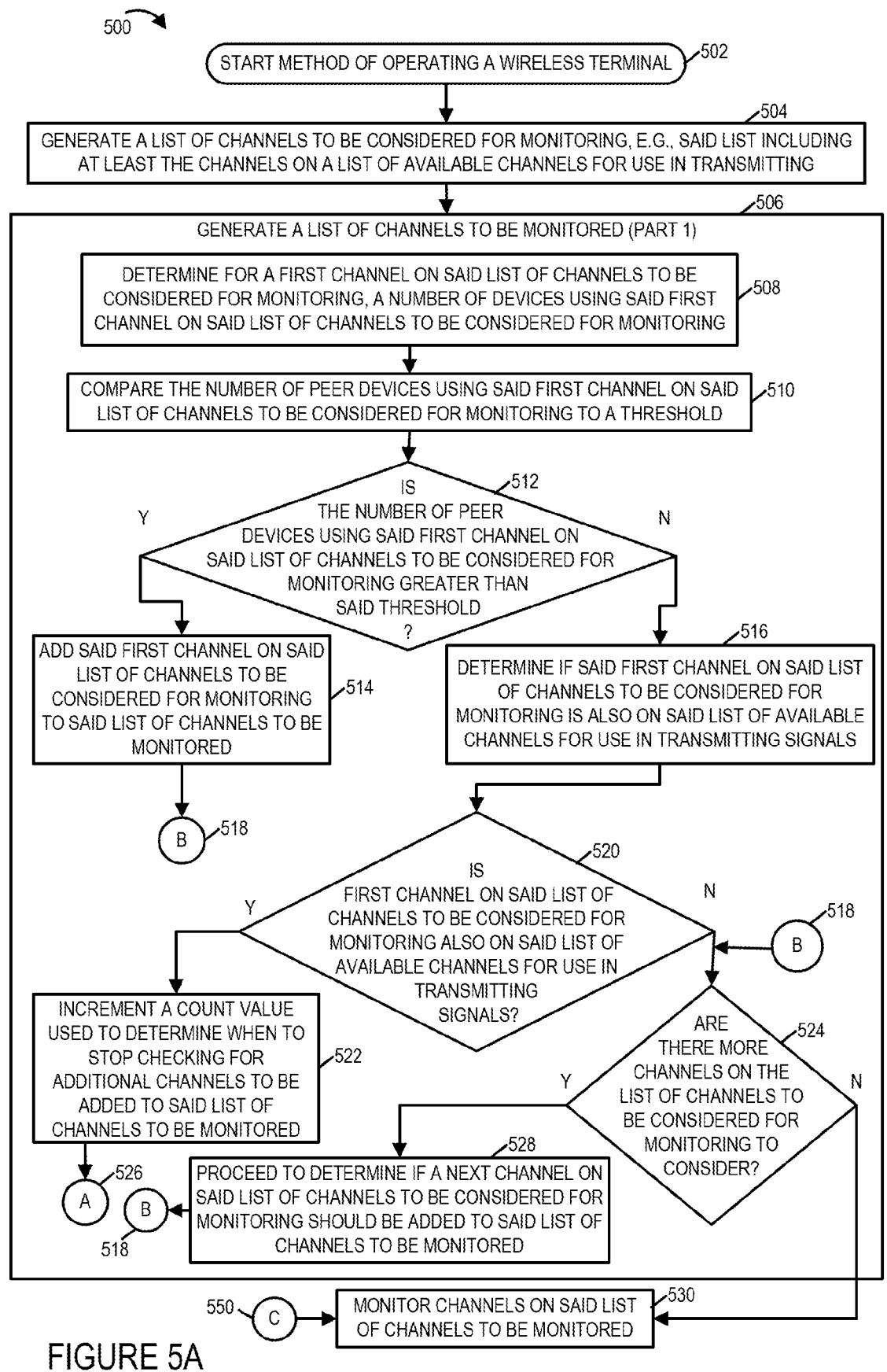
FIG. 5A is a first part of a flowchart of an exemplary method of operating a wireless terminal in accordance with various exemplary embodiments.

FIG. 5, comprising the combination of FIG. 5A and FIG. 5B, is a flowchart 500 of an exemplary method of operating a wireless terminal in accordance with an exemplary embodiment. The wireless terminal is, e.g., one of the wireless communications devices of FIG. 1. Operation starts in step 502, where the wireless terminal is powered on and initialized and proceeds to step 504. In step 504 the wireless terminal generates a list of channels to be considered for monitoring. In some embodiments, said list of channels to be considered for monitoring includes at least the channels on a list of available channels for use in transmitting. Operation proceeds from step 504 to step 506.

In step 506 the wireless terminal generates a list of channels to be monitored. In various embodiments, the generated list of channels to be monitored is based on said list of channels to be considered for monitoring and a number of devices using a first channel on said list of channels to be considered for monitoring. Step 506 includes steps 508, 510, 512, 514, 516, 520, 522, 524, 528, 532, 534, 536, 538, 540, 542, 544, 546 and 548.

In step 508, the wireless terminal determines, for a first channel on said list of channels to be considered for monitoring, a number of peer devices using said first channel on said list of channels to be considered for monitoring. Operation proceeds from step 508 to step 510, in which the wireless terminal compares the determined number of peer devices using said first channel on said list of channels to be considered for monitoring to a threshold. Operation proceeds from step 510 to step 512.

In step 512, if the comparison of step 510 indicates that the number of peer devices using said first channel on said list of channels to be considered for monitoring is greater than said threshold, then operation proceeds from step 512 to step 514; otherwise operation proceeds from step 512 to step 516.

In step 516, the wireless terminal determines if said first channel on said list of channels to be considered for monitoring is also on said list of available channels for use in transmitting signals. Operation proceeds from step 516 to step 520.

In step 520, if the determination of step 516 indicates that said first channel on said list of channels to be considered for monitoring is also on said list of available channels for use in transmitting signals, then operation proceeds from step 520 to step 522; otherwise operation proceeds from step 520 to step 524. In step 524 the wireless terminal checks as to whether or not there are more channels on said list of channels to be considered for monitoring to consider. If there are not more channels on said list of channels to be considered for monitoring to consider, then operation proceeds from step 524 to step 530, where the wireless terminal monitors channels on said list of channels to be monitored; otherwise, operation proceeds from step 524 to step 528, in which the wireless terminal proceeds to determine if a next channel on said list of channels to be considered for monitoring should be added to said list of channels to be monitored, e.g., without including said first channel in said list of channels to be monitored. Operation proceeds from step 528, via connecting node B 518 to step 524.

Returning to step 514, in step 514 the wireless terminal adds said first channel on said list of channels to be considered for monitoring to said list of channels to be monitored. Operation proceeds from step 514, via connecting node B 518 to step 524.

Returning to step 522, in step 522 the wireless terminal increments a count value to be used to determine when to stop checking for additional channels to be added to said list of channels to be monitored. Operation proceeds from step 522, via connecting node A 526, to step 532. In step 532 the wireless terminal determines a number of peer devices using a second channel on said list of channels to be considered for monitoring. Then, in step 534 the wireless terminal compares the number of peer devices using said second channel on said list of channels to be considered for monitoring to said threshold. Operation proceeds from step 534 to step 536.

In step 536, if the comparison of step 534 indicates that the number of peer devices using said second channel on said list of channels to be considered for monitoring is greater than said threshold, then operation proceeds from step 536 to step 538; otherwise operation proceeds from step 536 to step 540.

Returning to step 538, in step 538 the wireless terminal adds said second channel on said list of channels to be considered for monitoring to said list of channels to be monitored. Operation proceeds from step 538, via connecting node B 518 to step 524.

Returning to step 540, in step 540 the wireless terminal determines if said second channel on said list of channels to be considered for monitoring is also on said list of available channels for use in transmitting signals. Operation proceeds from step 540 to step 542. In step 542, if the determination of step 540 is that the second channel on said list of channels to be considered for monitoring is also on said list of available channels for use in transmitting signals, then operation proceeds from step 542 to step 544; otherwise, operation proceeds from step 542, via connecting node B 518 to step 524.

Returning to step 544, in step 544, the wireless terminal increments said count value used to determine when to stop checking for additional channels to be added to said list of channels to be monitored. Operation proceeds from step 544 to step 546, in which the wireless terminal compares the incremented count value to a stop value used to determine if no further channels on said list of channels to be considered for monitoring should be checked. In one exemplary embodiment the stop value equals 2. Operation proceeds from step 546 to step 548. In step 548, if the comparison of step 546 indicates that the count value equals the stop value, then operation proceeds from step 548 via connecting node C 550 to step 530, in which the wireless terminal monitors channels on said list of channels to be monitored. However, in step 548, if the comparison of step 546 indicates the count value does not equal the stop value, then operation proceeds from step 548 via connecting node B 518 to step 524, where the wireless terminal checks if there are more channels on the list of channels to be considered for monitoring to consider.

FIG. 6 is a drawing of an exemplary wireless terminal 600, in accordance with an exemplary embodiment. Exemplary wireless terminal 600 is, e.g., one of the wireless communications devices of FIG. 1. Exemplary wireless terminal 600 may, and sometimes does, implement a method in accordance with flowchart 500 of FIG. 5. Wireless terminal 600 includes a processor 602 and memory 604 coupled together via a bus 609 over which the various elements (602, 604) may interchange data and information. Wireless terminal 600 further includes an input module 606 and an output module 608 which may be coupled to processor 602 as shown. However, in some embodiments, the input module 606 and output module 608 are located internal to the processor 602. Input module 606 can receive input signals. Input module 606 can, and in some embodiments does, include a wireless receiver and/or a wired or optical input interface for receiving input. Output module 608 may include, and in some embodiments does include, a wireless transmitter and/or a wired or optical output interface for transmitting output.

Processor 602 is configured to: generate a list of channels to be considered for monitoring; generate a list of channels to be monitored; determine for a first channel on said list of channels to be considered for monitoring, a number of devices using said first channel on said list of channels to be considered for monitoring, as part of being configured to generate a list of channels to be monitored; and monitor channels on said list of channels to be monitored. In some embodiments, said list of channels to be considered for monitoring includes at least the channels on a list of available channels for use in transmitting signals. In some embodiments, processor 602 is further configured to generate said list of channels to be monitored based on said list of channels to be considered for monitoring and said number of devices determined to be using said first channel on said list of channels to be considered for monitoring, as part of being configured to generate a list of channels to be monitored.

Processor 602, in some embodiments, is further configured to: compare the number of peer devices using said first channel in said list of channels to be considered for monitoring to a threshold; and add said first channel in said list of channels to be considered for monitoring to said list of channels to be monitored, when said comparing the number of peer devices using said first channel in said list of channels to be considered for monitoring to a threshold indicates that the number of peer devices using the first channel in said list of channels to be considered for monitoring is greater than said threshold, as part of being configured to generate a list of channels to be monitored. Processor 602, in some embodiments, is further configured to: proceed to determine if a next channel in said list of channels to be considered for monitoring should be added to said list of channels to be monitored without including said first channel in said list of channels to be monitored, when said comparing the number of peer devices using said first channel in said list of channels to be considered for monitoring to a threshold indicates that the number of peer devices using the first channel in said list of channels to be considered for monitoring is less than or equal to said threshold, as part of being configured to generate a list of channels to be monitored.

In various embodiments, processor 602 is further configured to: determine if said first channel on said list of channels to be considered for monitoring is also on said list of available channels for use in transmitting signals; and increment a count value used to determine when to stop checking for additional channels to be added to said list of channels to be monitored when it is determined that said first channel in said list of channels to be considered for monitoring is also on said list of available channels for use in transmitting signals, when said comparing the number of peer devices using said first channel in said list of channels to be considered for monitoring to a threshold indicates that the number of peer devices using the first channel in said list of channels to be considered for monitoring is less than or equal to said threshold, as part of being configured to generate a list of channels to be monitored.

Processor 602, in various embodiments, is further configured to: determine a number of peer devices using a second channel in said list of channels to be considered for monitoring; and compare the number of peer devices using said second channel in said list of channels to be considered for monitoring to said threshold; and add said second channel in said list of channels to be considered for monitoring to said list of channels to be monitored, when said comparing indicates that the number of peer devices using the second channel in said list of channels to be considered for monitoring is greater than said threshold, as part of being configured to generate a list of channels to be monitored. In some embodiments, processor 602 is further configured to: determine if said second channel in said list of channels to be considered for monitoring is also on said list of available channels for use in transmitting signals; and increment said count value used to determine when to stop checking for additional channels to be added to said list of channels to be monitored when it is determined that said second channel in said list of channels to be considered for monitoring is also on said list of available channels for use in transmitting signals; and compare said incremented count value to a stop value used to determine if no further channels in said list of channels to be considered for monitoring should be checked, when said comparing the number of peer devices using said second channel in said list of channels to be considered for monitoring to the threshold indicates that the number of peer devices using the second channel in said list of channels to be considered for monitoring is less than or equal to said threshold, as part of being configured to generating a list of channels to be monitored.

Figure 7A:
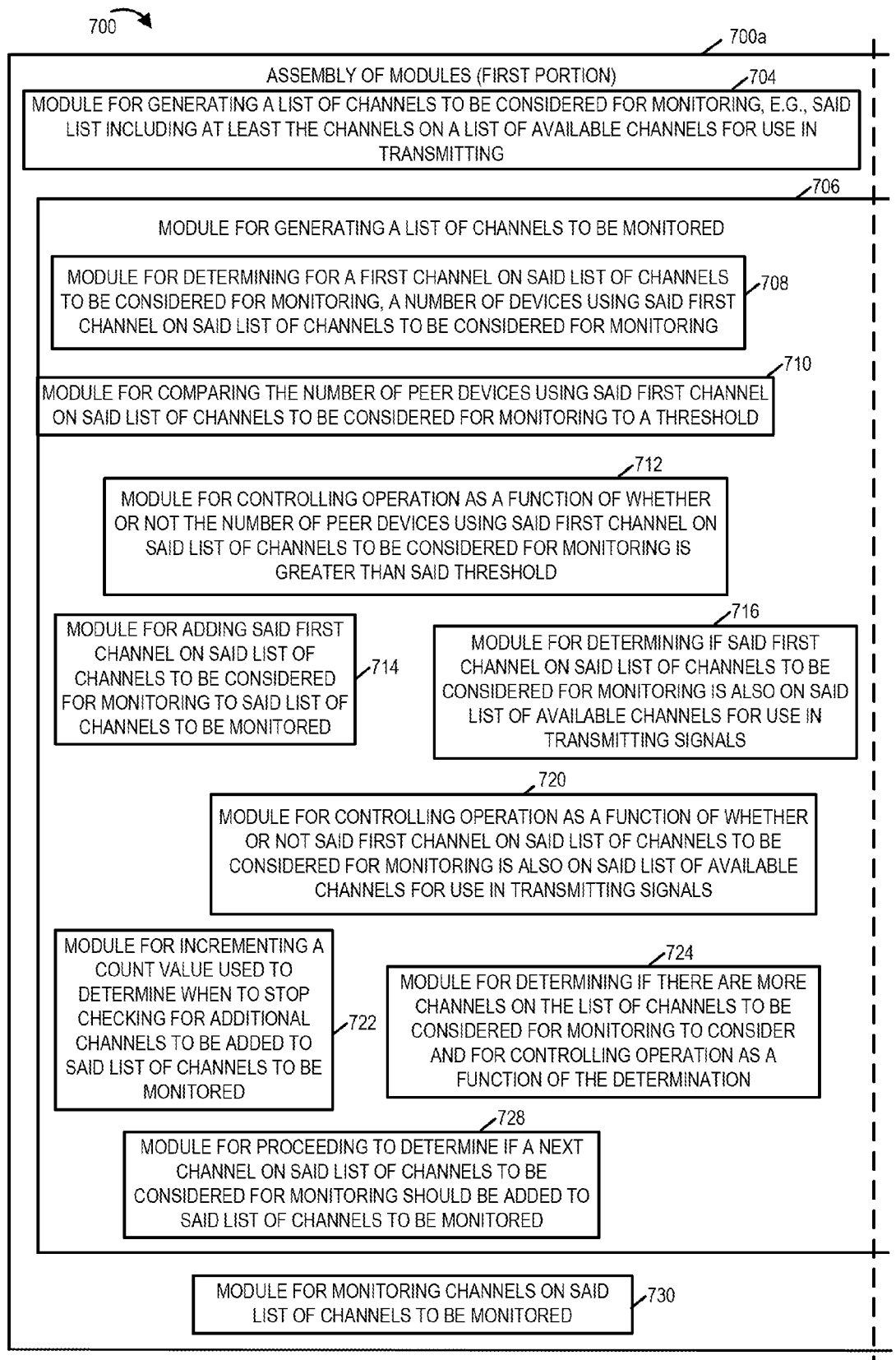
FIG. 7A is a first portion of an assembly of modules which can, and in some embodiments is, used in the wireless terminal illustrated in FIG. 6.

FIG. 7, comprising the combination of FIG. 7A and FIG. 7B is an assembly of modules 700 which can, and in some embodiments is, used in the wireless terminal 600 illustrated in FIG. 6. Assembly of modules 700 includes first portion 700a and second portion 700b. The modules in the assembly 700 can be implemented in hardware within the processor 602 of FIG. 6, e.g., as individual circuits. Alternatively, the modules may be implemented in software and stored in the memory 604 of the wireless terminal 600 shown in FIG. 6. While shown in the FIG. 6 embodiment as a single processor, e.g., computer, it should be appreciated that the processor 602 may be implemented as one or more processors, e.g., computers. When implemented in software the modules include code, which when executed by the processor, configure the processor, e.g., computer, 602 to implement the function corresponding to the module. In some embodiments, processor 602 is configured to implement each of the modules of the assembly of modules 700. In embodiments where the assembly of modules 700 is stored in the memory 604, the memory 604 is a computer program product comprising a computer readable medium comprising code, e.g., individual code for each module, for causing at least one computer, e.g., processor 602, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 7 control and/or configure the wireless terminal 600 or elements therein such as the processor 602, to perform the functions of the corresponding steps illustrated and/or described in the method of flowchart 500 of FIG. 5.

FIG. 7, comprising the combination of FIG. 7A and FIG. 7B, is an assembly of module 700 in accordance with an exemplary embodiment. Assembly of modules 700 includes a first portion 700a and a second portion 700b.

Assembly of modules 700 includes a module 704 for generating a list of channels to be considered for monitoring, a module 706 for generating a list of channels to be monitored and a module 730 for monitoring channels on said list of channels to be monitored. In some embodiments, said list of channels to be considered for monitoring which is generated by module 704 includes at least the channels on a list of available channels for use in transmitting. In some embodiments, module 706 generates a list of channels to be monitored based on said list of channels to be considered for monitoring and a number of devices determined to be using a first channel on said list of channels to be considered for monitoring.

Module 706 includes a module 708 for determining for a first channel on said list of channels to be considered for monitoring a number of devices using said first channel on said list of channels to be considered for monitoring, a module 710 for comparing the number of peer devices using said first channel on said list of channels to be considered for monitoring to a threshold, and a module 712 for controlling operation as a function of whether or not the number of peer devices using said first channel on said list of channels to be considered for monitoring is greater than said threshold. Module 706 further includes a module 714 for adding said first channel on said list of channels to be considered for monitoring to said list of channels to be monitored, a module 716 for determining if said first channel on said list of channels to be considered for monitoring is also on said list of available channels for use in transmitting signals, 720 a module for controlling operation as a function of whether or not said first channel on said list of channels to be considered for operation is also on said list of available channels for use in transmitting signals, a module 722 for incrementing a count value used to determined when to stop checking for additional channels to be added to said list of channels to be monitored, a module 724 for determining if there are more channels on the list of channels to be considered for monitoring to consider and for controlling operation as a function of the determination, and a module 728 for proceeding to determine if a next channel on said list of channels to be considered for monitoring should be added to said list of channels to be monitored, e.g., without including said first channel in said list of channels to be monitored.

Module 706 further includes a module 732 for determining a number of peer devices using a second channel on said list of channels to be considered for monitoring, a module 734 for comparing the number of peer devices using said second channel on said list of channels to be considered for monitoring it said threshold, a module 736 for controlling operation as a function of whether or not a comparison indicates that the number of peer devices using said second channel on said list of channels to be considered for monitoring is greater than said threshold, a module 738 for adding said second channel on said list of channels to be considered for monitoring to said list of channels to be monitored and a module 740 for determining if said second channel on said list of channels to be considered for monitoring is also on said list of available channels for use in transmitting signals, and a module 742 for controlling operation as a function of whether or not said second channel on said list of channels to be considered for monitoring is also on said list of available channels for use in transmitting signals. Module 706 further includes a module 744 for incrementing said count value used to determine when to stop checking for additional channels to be added to said list of channels to be monitored, a module 746 for comparing said incremented count value to a stop value used to determine if no further channels on said list of channels to be considered for monitoring should be checked, and a module 748 for controlling operation as a function of whether or not said count value equals said stop value.

Figure 8A:
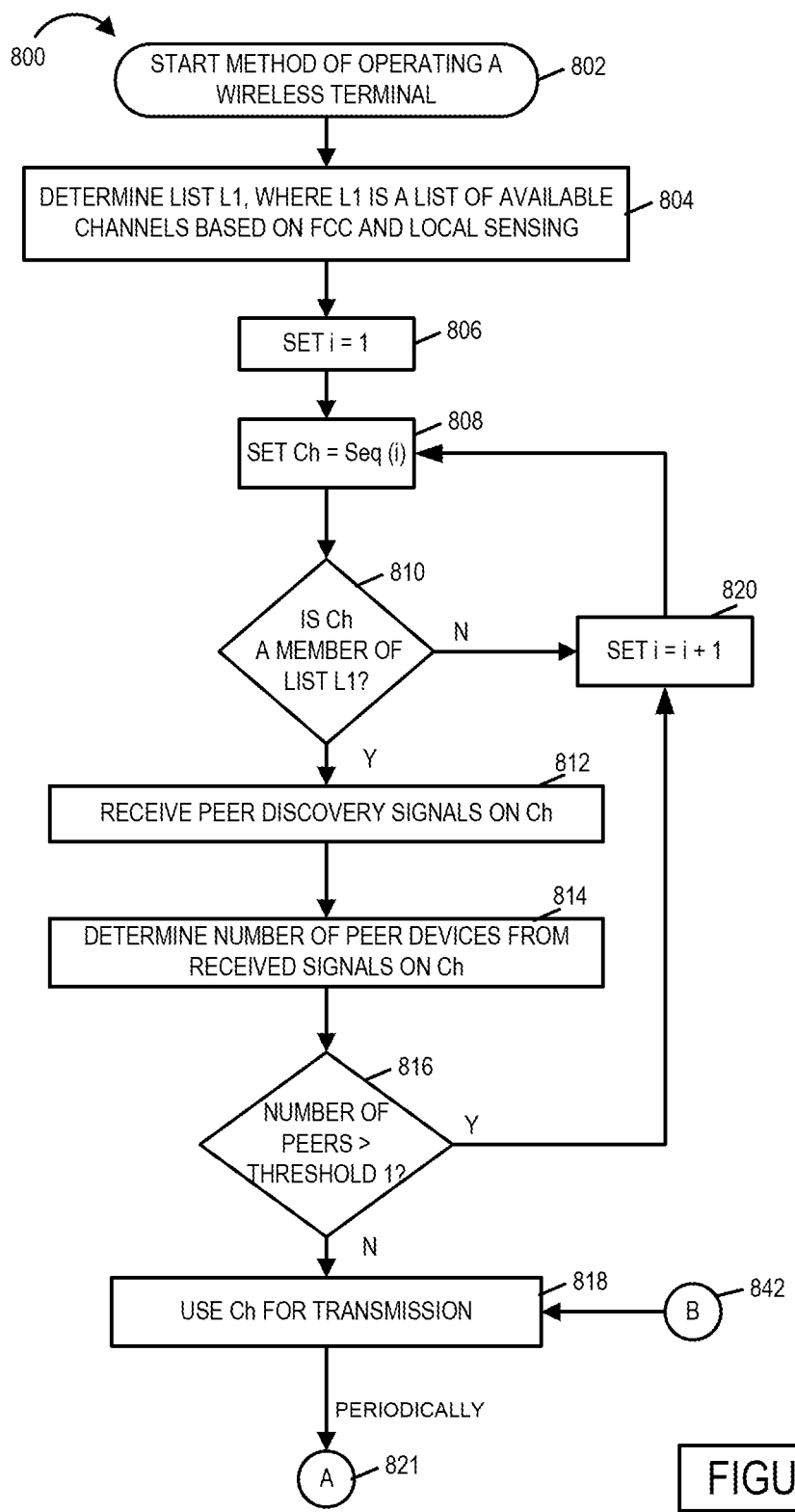
FIG. 8, comprising the combination of FIG. 8A
FIG. 8B is a flowchart of an exemplary method of operating a wireless terminal in accordance with an exemplary embodiment.
Figure 8B:
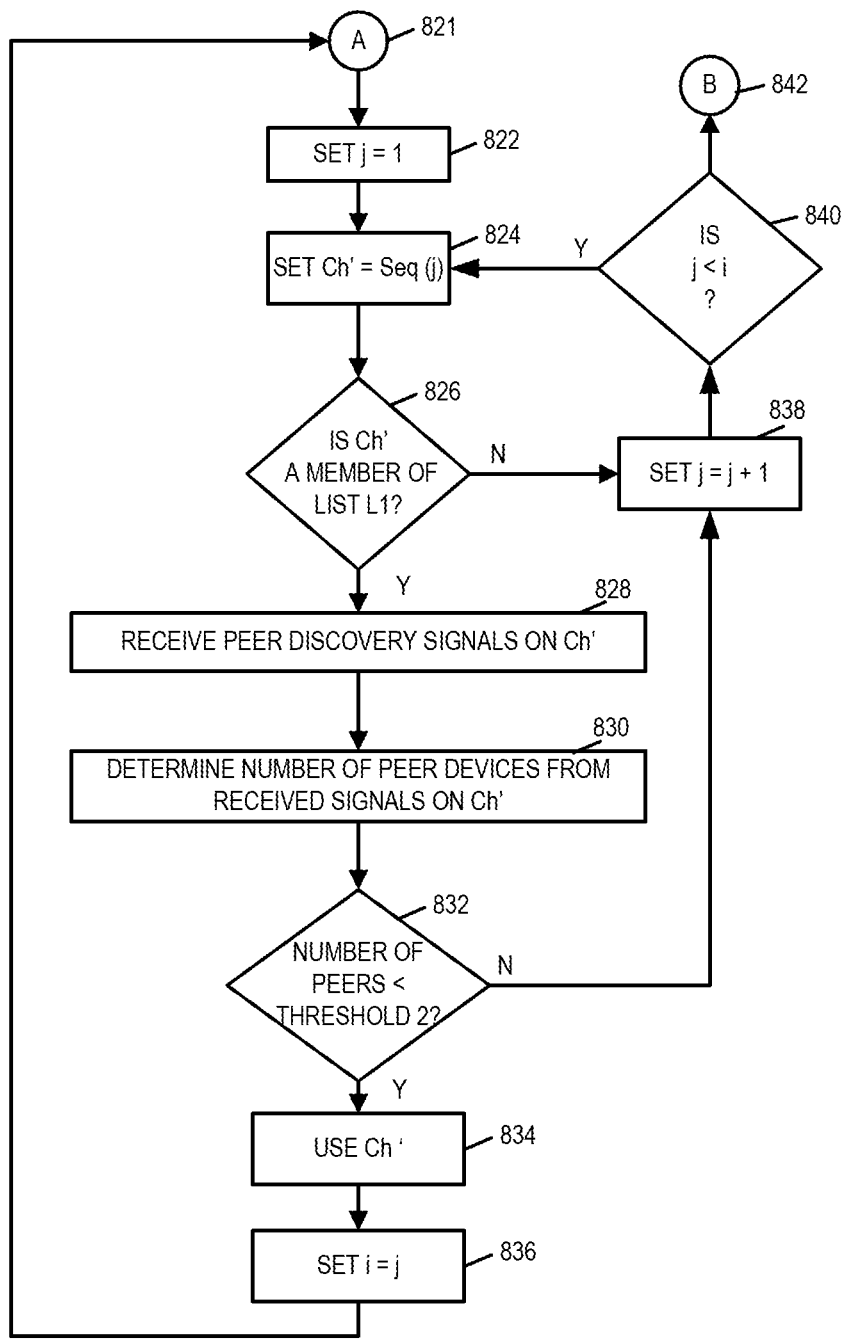

FIG. 8, comprising the combination of FIG. 8A and FIG. 8B is a flowchart 800 of an exemplary method of operating a wireless terminal in according with an exemplary embodiment. The wireless terminal is, e.g., one of the wireless communications devices of FIG. 1. Operation of the exemplary method starts in step 802, where the wireless terminal is powered on and initialized, and proceeds to step 804. In step 804, the wireless terminal determines a list L1. List L1 is a list of available channels at the wireless terminal's location, e.g., a list that was determined based on FCC information and local sensing of the channels. The FCC information, in some embodiments, is retrieved, e.g., via a base station and/or the Internet, from information stored remotely, e.g., at a centralized server. In various embodiments, the FCC information identifies channels which, from the FCC perspective, may be used for peer to peer network communications at a particular location. The wireless terminal, in some embodiments, also performs local sensing, e.g., to detect the use of channels for purposes which have precedence over peer to peer communications, e.g., in accordance with FCC regulations. For example, one channel, which may be identified as being available for peer to peer communications use, by information communicated from an FCC server, may currently be occupied by wireless microphone communications which preempts peer to peer communications. Therefore, in forming list L1, the wireless terminal may, and sometimes does, remove channels identified as being available in the FCC communicated information to eliminate those channels which are determined to be in use by devices having priority over peer to peer communications.

Operation proceeds from step 804 to step 806, in which the wireless terminal sets index i equal to 1. Then, in step 808 the wireless terminal sets variable Ch equal to Seq(i). In this exemplary embodiment, there is a predetermined sequence of channels to be considered, and the sequence is consistent across the devices. Thus in step 808 the wireless terminal sets the variable Ch to identify the channel corresponding to channel sequence element Seq(i). Operation proceeds from step 808 to step 810.

In step 810 the wireless terminal determines whether or not the channel identified by Ch is a member of the list L1. If Ch is a member of list L1, then operation proceeds from step 810 to step 812; otherwise operation proceeds from step 810 to step 820.

Returning to step 812, in step 812 the wireless terminal receives peer discovery signals on the channel identified by Ch. Then, in step 814, the wireless terminal determines from the received peer discovery signals of step 812, the number of peer devices currently using channel Ch. Operation proceeds from step 814, to step 816.

In step 816 the wireless terminal compares the determined number of peers from step 814 to a first threshold, threshold 1. If the determined number of peers is greater than threshold 1, then operation proceeds from step 816, to step 820; otherwise operation proceeds from step 816 to step 818.

In step 818, the wireless terminal uses channel Ch for transmission. Thus, the wireless terminal in step 818 is using a channel from list L1 which was the lowest channel in accordance with the channel ordering sequence which satisfied the test condition of step 816. For example, the channel selected for use for transmission is the lowest ordered channel on List L1 which is not currently full in accordance with loading criteria of step 816.

Returning to step 820, in step 820 the index i is incremented by one. Operation proceeds from step 820 to step 808, where the wireless terminal sets Ch to the next channel in the sequence, so that it can be monitored and tested.

Returning to step 818, once operation has proceeded to step 818 and a channel has been selected to be used for transmission and is being used for transmission, periodically, operation proceeds from step 818, via connecting node A 821. The wireless terminal, in the section of the flowchart of FIG. 8B, evaluates if conditions have changed such that the wireless terminal can transition from using the channel Ch for transmission to a lower ordered channel in the predetermined sequence for transmission. For example, activity may have decreased on one or more lower order channels, e.g., with some peer devices powering down or moving out of the local vicinity, thus lowering the number of peer devices transmitting on a channel and freeing up a space where the wireless terminal may migrate to.

Operation proceeds from step 818, via connecting node A 821 to step 822, in which the wireless terminal sets index j equal to 1. Then, in step 824 the wireless terminal sets variable Ch' equal to Seq(j). Thus in step 824 the wireless terminal sets the variable Ch' to identify the channel corresponding to channel sequence element Seq(j). Operation proceeds from step 824 to step 826.

In step 826 the wireless terminal determines whether or not the channel identified by Ch' is a member of the list L1. If Ch' is a member of list L1, then operation proceeds from step 826 to step 828; otherwise operation proceeds from step 826 to step 838.

Returning to step 828, in step 828 the wireless terminal receives peer discovery signals on the channel identified by Ch'. Then, in step 830, the wireless terminal determines from the received peer discovery signals of step 828, the number of peer devices currently using channel Ch'. Operation proceeds from step 830, to step 832.

In step 832 the wireless terminal compares the determined number of peers from step 830 to a second threshold, threshold 1. Threshold 2 of step 832 is less than threshold 1 of step 816. If the determined number of peers is less than threshold 2, then operation proceeds from step 832, to step 834; otherwise operation proceeds from step 832 to step 838.

In step 834, the wireless terminal determines to use channel Ch' for transmission. Then in step 836 the wireless terminal sets i=j. Thus, the wireless terminal in step 836 resets the channel Ch used for transmission of step 818 to the channel Ch' of step 834. Operation proceeds from step 836 to connecting node A 821.

Returning to step 838, in step 838, the wireless terminal increments index j by one. Operation proceeds from step 838, to step 840. In step 840 the wireless terminal tests if the current value of j is less than the current value of i. If j is less than i, then operation proceeds from step 840 to step 824, where Ch' is set to the next channel in the sequence, so that the next ordered channel in the sequence may be tested for current activity.

However, if in step 840, j is not less than i, then operation proceeds from step 840 via connecting node B 842 to step 818, where the wireless terminal continues to use the channel identified by Ch for transmission. The decision step of 840 allows for a channel having a lower order in the channel sequence to replace the channel being currently used for transmission, e.g., provided criteria of step 832 is satisfied. Higher ordered channel in accordance with the sequence are precluded for consideration to replace the channel currently being used for transmission by the wireless terminal.

Figure 9:
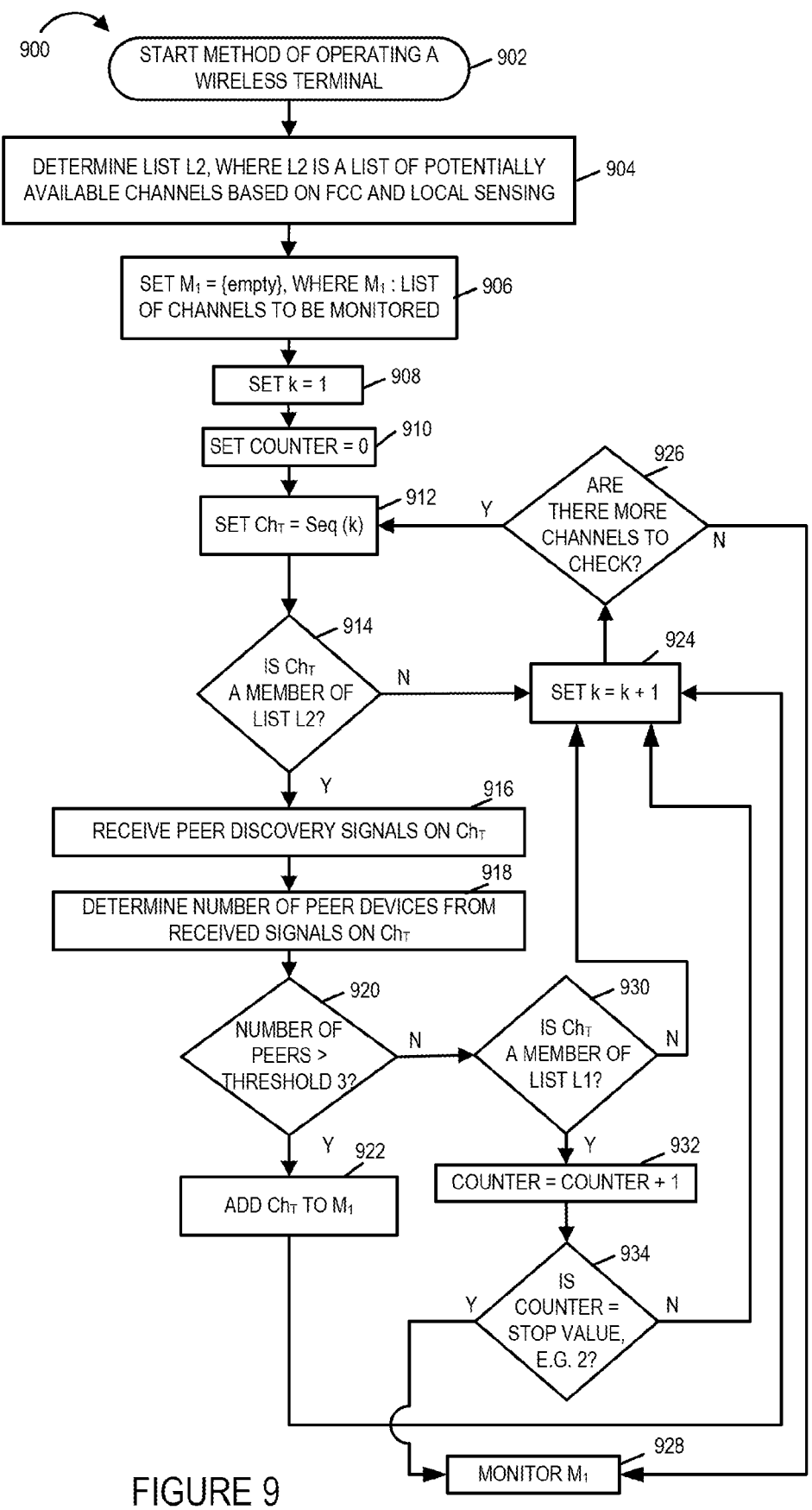
FIG. 9 is a flowchart of an exemplary method of operating a wireless terminal in accordance with an exemplary embodiment.

FIG. 9 is a flowchart 900 of an exemplary method of operating a wireless terminal in accordance with an exemplary embodiment. The wireless terminal is, e.g., one of the wireless communications devices of FIG. 1. Operation of the exemplary method starts in step 902, where the wireless terminal is powered on and initialized, and proceeds to step 904. In step 904, the wireless terminal determines a list L2. List L2 is a list of potentially available channels at the wireless terminal's location which may be received, e.g., a list that was determined based on FCC information and local sensing of the channels, and, optionally, on information indicating channels, e.g., broadcast channels, on which information may be received but which may not be available for transmitting peer to peer signals. The FCC information, in some embodiments, is retrieved, e.g., via a base station and/or the Internet, from information stored remotely, e.g., at a centralized server. In various embodiments, the FCC information identifies channels which, from the FCC perspective, may be used for peer to peer network communications at a particular location. In forming list L2, the wireless terminal may, and sometimes does include FCC information corresponding to a current location and one or more adjacent locations.

The wireless terminal, in some embodiments, also performs local sensing, e.g., to detect the use of channels for purposes which have precedence over peer to peer communications, e.g., in accordance with FCC regulations. For example, one channel, which may be identified as being available for peer to peer communications use, by information communicated from an FCC server, may currently be occupied by wireless microphone communications which preempts peer to peer communications. Therefore, in forming list L2, the wireless terminal may, and sometimes does, remove channels identified as being available in the FCC communicated information to eliminate those channels which are determined to be in use by devices having priority over peer to peer communication.

In some embodiments, the wireless terminal determines a list L1 of available channels with regard to transmission, e.g., as in flowchart 800 of FIG. 8, and the member of L1 are included on list L2; however, L2 may be and sometimes does, include additional channels that are not included on list L1. For example, in generating list L2, the wireless terminal may, and sometimes does, include channels identified by FCC information to be available in adjacent regions. Since in the method of FIG. 9, the method is directed to receiving, the wireless terminal can, and in some embodiments, does, monitor channels in which it is prohibited from transmitting into.

Operation proceeds from step 904 to step 906. In step 906 the wireless terminal sets $M_1$ to the empty set, where $M_1$ is a list of channels to be monitored by the wireless terminal. Operation proceeds from step 906 to step 908, in which the wireless terminal sets index k equal to 1. Then in step 910, the wireless terminals set the variable COUNTER equal to 0. Operation proceeds from step 910 to step 912.

In step 912 the wireless terminal sets variable $Ch_T$ equal to Seq(k). In this exemplary embodiment, there is a predetermined sequence of channels to be considered, and the sequence is consistent across the devices. Thus in step 912 the wireless terminal sets the variable $Ch_T$ to identify the channel corresponding to channel sequence element Seq(k). Operation proceeds from step 912 to step 914.

In step 914 the wireless terminal determines whether or not the channel identified by $Ch_T$ is a member of the list L2. If $Ch_T$ is a member of list L2, then operation proceeds from step 914 to step 916; otherwise, operation proceeds from step 914 to step 924.

Returning to step 916, in step 916 the wireless terminal receives peer discovery signals on the channel identified by $Ch_T$. Then, in step 918, the wireless terminal determines from the received peer discovery signals of step 916, the number of peer devices currently using channel $Ch_T$. Operation proceeds from step 916, to step 918.

In step 920 the wireless terminal compares the determined number of peers from step 918 to a third threshold, threshold 3. If the determined number of peers is greater than threshold 3, then operation proceeds from step 920, to step 922; otherwise operation proceeds from step 920 to step 930.

In step 922, the wireless terminal adds channel $Ch_T$ to the list of channels to be monitored $M_1$. Thus, in this exemplary embodiment, if activity above a minimum threshold, threshold 3, is detected the wireless terminal determines to monitor the channel being tested. Operation proceeds from step 922 to step 924.

Returning to step 930, in step 930 the wireless terminal checks to determine whether or not channel $Ch_T$ is a member of list L1, where list L1 is the list of available channels for peer to peer transmission, from the wireless terminals perspective. If the channel $Ch_T$ is a member of list L1, then operation proceeds from step 930 to step 932; otherwise, operation proceeds from step 930 to step 924.

Returning to step 932, in step 932 the wireless terminal increments the variable COUNTER by 1. Then operation proceeds from step 932 to step 934. In step 934, the wireless terminal compares the variable COUNTER to a stop value. In some embodiments, the stop value is 2. In step 934, if the comparison indicates that COUNTER equals the stop value, then operation proceeds from step 934 to step 928; otherwise, operation proceeds from step 934 to step 924.

In step 924, the wireless terminal increments the index value k by 1. Operation proceeds from step 924, to step 926. In step 926, the wireless terminal determines whether or not there are more channels to check. If there are more channels to check, then operation proceeds from step 926 to step 912, where $Ch_T$ is set to the next channel in the ordered sequence so that the channel can be tested. However, if in step 926, the wireless terminal determines that there are no more channels to check, then operation proceeds from step 926 to step 928. In step 928 the wireless terminal monitors the channels on list $M_1$. In some embodiments, in which broadcast channels may be monitored in addition to peer to peer channels, the broadcast channels which are to be monitored are added to the list $M_1$ prior to the monitoring step 928.

In some embodiments, a wireless terminal performs one of the method of flowchart 800 of FIG. 8 and the method of flowchart 900 of FIG. 9. In some embodiments, the wireless terminal performs both the method of flowchart 800 and the method of flowchart 900 of FIG. 9. For example, the method of flowchart 900 may be performed following the method of flowchart 800. Alternatively, the methods of flowchart 800 and flowchart 900 may be performed in parallel.

Figure 10:
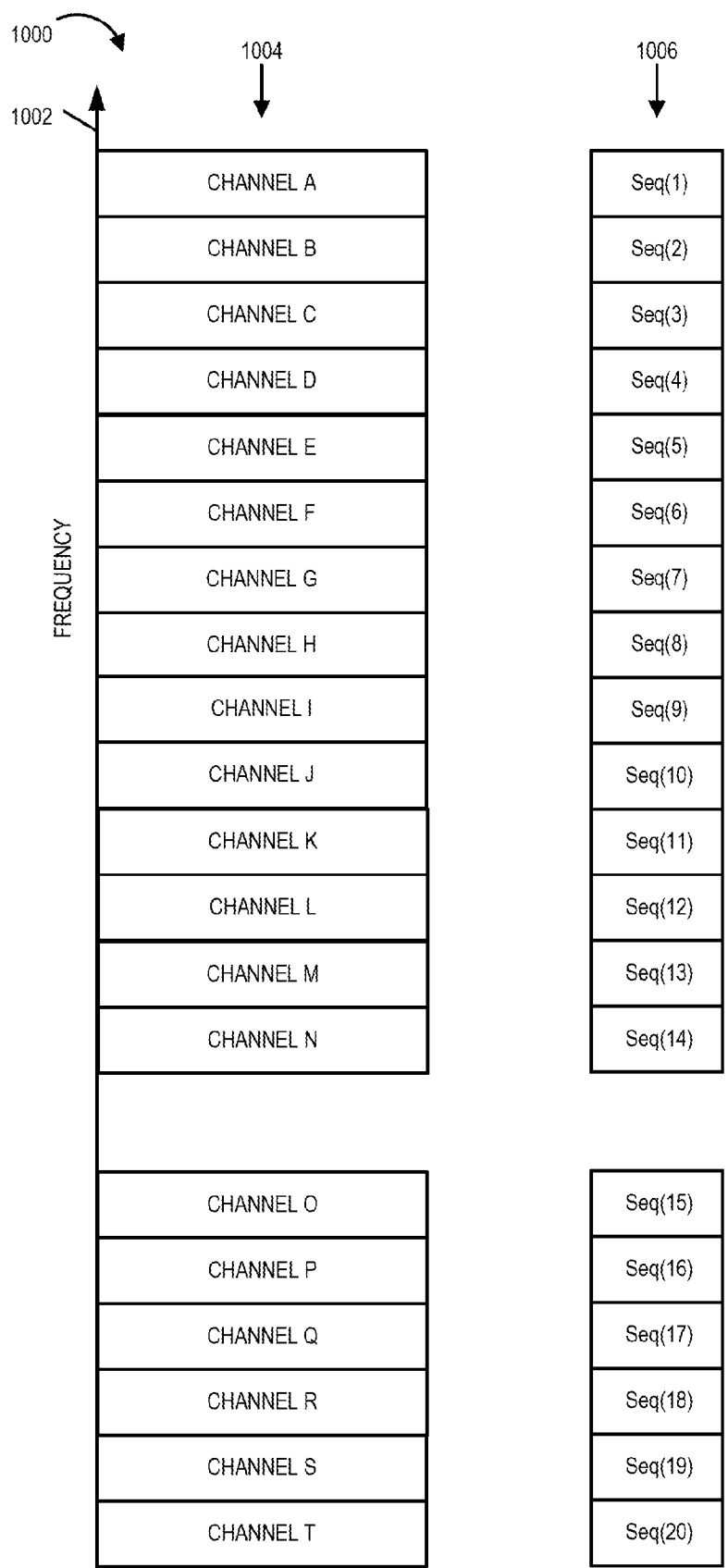
FIG. 10 is a drawing illustrating exemplary channels and an exemplary channel ordering sequence.

FIGS. 10-16 illustrate an example in which an exemplary wireless terminal determines which channel to use for peer to peer transmission in accordance with an exemplary embodiment. FIG. 10 is a drawing 1000 including an exemplary frequency spectrum identifying exemplary channels which may be, and sometimes are, used for peer to peer communications. Vertical axis 1002 represents frequency. In this exemplary embodiment there are 20 exemplary channels 1004 which may be used for peer to peer communications. At different locations in the system, different sets of the channels may be available, e.g., in accordance with FCC channel information corresponding to available white space which may be used for peer to peer communications. In accordance with various embodiments, there is a predetermined ordering 1006 of the channels, which is known the wireless terminals. In this exemplary embodiment, the channels sequencing is such that channel (A, B, C, D, E, F, G, H, I, J, K, L, M, N, O, P, Q, R, S, T) corresponds to the (first, second, third, fourth, fifth, sixth, seventh, eight, ninth, tenth, eleventh, twelfth, thirteenth, fourteenth, fifteenth, sixteenth, seventeenth, eighteenth, nineteenth, twentieth) channels, respectively, in the sequence.

In this exemplary embodiment the sequence is such that the lower the order in the sequence, the higher the frequency. In some other embodiments, the ordering is reversed such that the lower the order in the sequence the lower the frequency. In still other embodiments, the predetermined ordering does not follow a single direction in terms of frequency; however the predetermined relationship between channels and ordering of the channels in the sequence is known to the wireless terminals. For example, in one exemplary embodiment using the channels of 1004, a different ordering is used than is shown in column 1006. For example, channel (A, B, C, D, E, F, G, H, I, J, K, L, M, N, O, P, Q, R, S, T) may correspond to (first, third, fifth, seventh, ninth, eleventh, thirteenth, fifteenth, seventeenth, nineteenth, second, fourth, sixth, eighth, tenth, twelfth, fourteenth, sixteenth, eighteenth, twentieth) channels, respectively, in the sequence.

Figure 11:
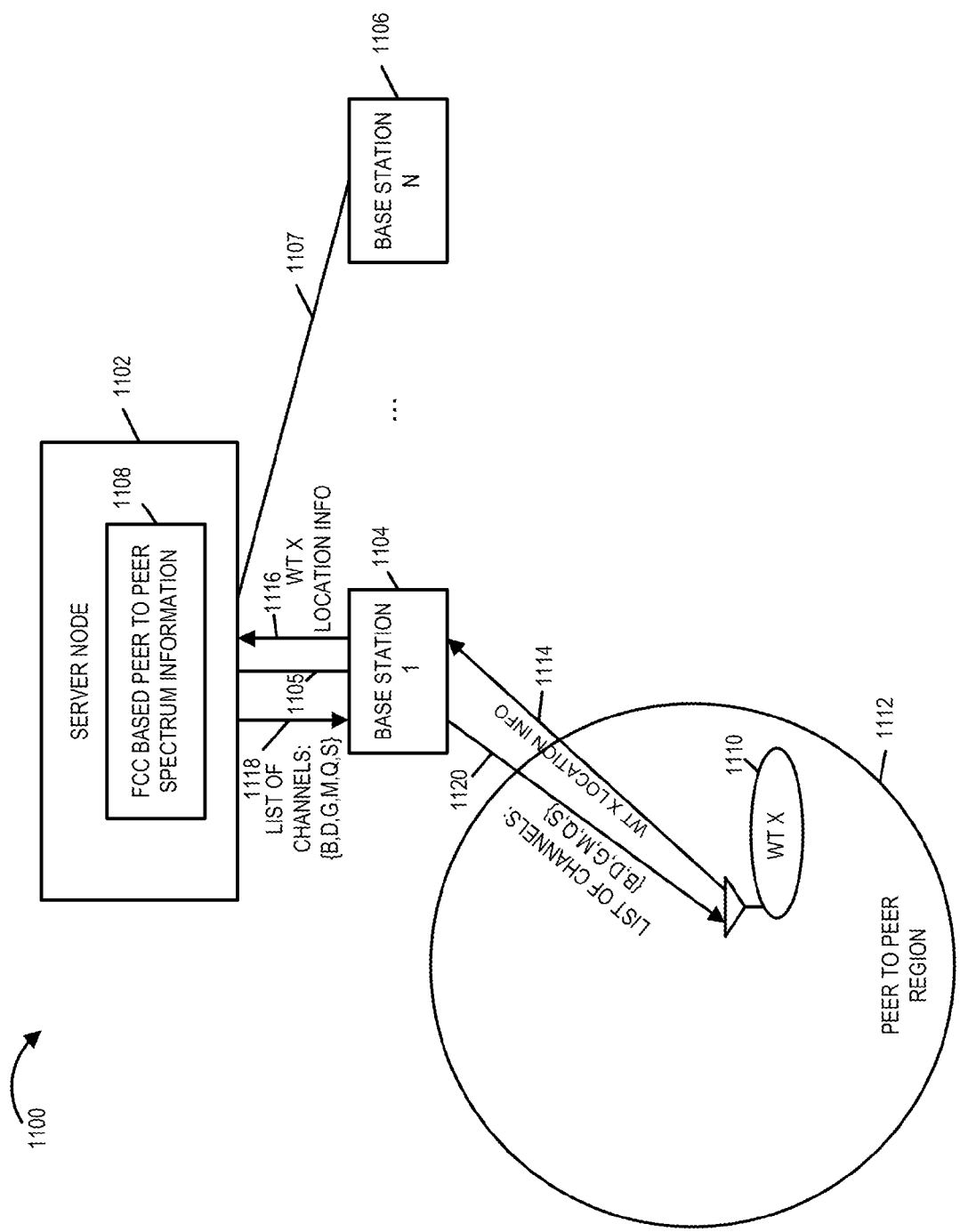
FIG. 11 illustrates an exemplary wireless communications system in which different channels may be used for peer to peer communications at different locations.

FIG. 11 is a drawing illustrating an exemplary wireless communications system 1100 including a server node 1102, a plurality of base stations (base station 1 1104, ... base station N 1106) coupled to the server node 1102 via links (1105, ..., 1107), respectively. The system 1100 also includes a plurality of wireless terminal supporting cellular and peer to peer communications. The plurality of wireless terminals includes exemplary wireless terminal X 1110. Exemplary wireless terminal X 1110 may implement a method in accordance with one or more of the flowcharts of FIGS. 2, 5, 8 and/or 9.

Wireless terminal X 1110 determines its location, e.g., from GPS, and sends a signal 1114 to base station 1 communicating its location. Wireless terminal X 1110 is located in region 1112. Base station 1 sends a signal 1116 to server node 1102 communicating WT X's location. Alternatively, the base station may determine the location of WT X 1110, e.g., without receiving location information from WT X, e.g., based on power measurements, and communicate the location of wireless terminal X to the server node 1102.

Server node 1102 includes FCC based peer to peer spectrum information 1108. Server node 1102 generates a list of channels, that from its perspective, wireless terminal X 1110 may use for peer to peer transmission signaling at its current location. In this example, the list of channels that it generates is {B, D, G, M, Q, S} and it sends signal 1118 communicating this list to base station 1 1104. Base station 1 1104 then transmits signal 1120 to wireless terminal X 1110 communicating the list. Thus, from the perspective of the server node 1104 six particular channels of the 20 channels 1004 are available.

Figure 12:
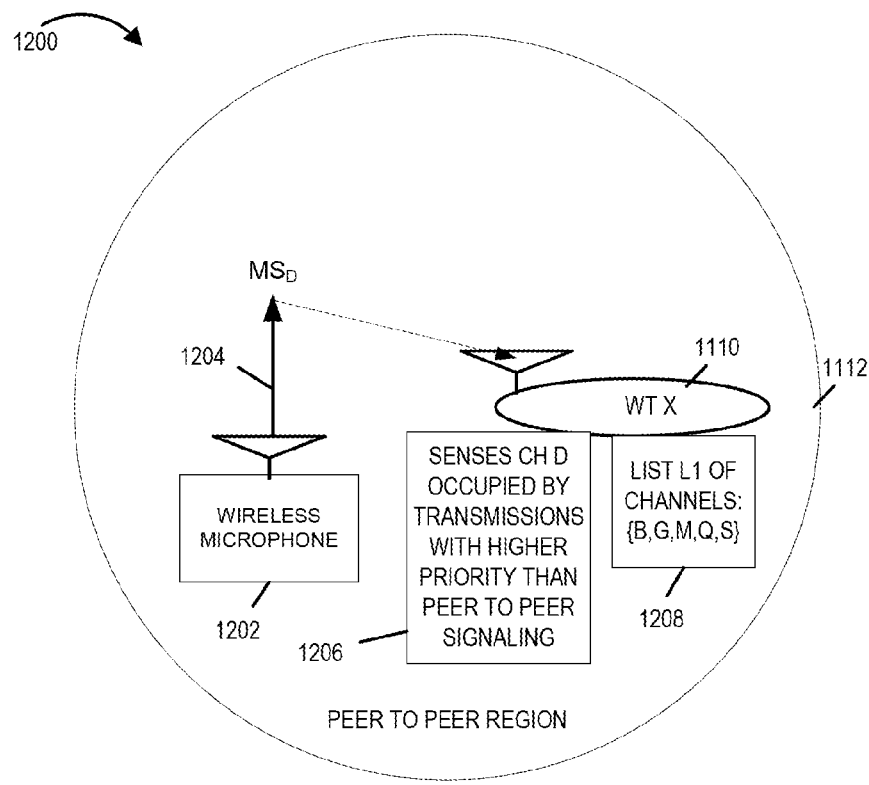
FIG. 12 is a drawing illustrating that a wireless terminal does local sensing to detect for signals which have precedence over peer to peer signaling, in accordance with an exemplary embodiment.

FIG. 12 is a drawing 1200 illustrating that wireless terminal X 1110 does local sensing to detect for signals which have precedence over peer to peer signaling, e.g., in accordance with FCC regulations. In this example, wireless microphone 1202 is transmitting signal $MS_D$ 1204 into channel D. WT X 1110 senses signal 1204 and determines that channel D is currently occupied by transmissions with higher priority than peer to peer signaling, as indicated by box 1206. Wireless terminal X 1110 generates list L1={B, G, M, Q, S}, where L1 is a list of available channels for use in transmitting signals, e.g., peer to peer signals. Note that channel D has been removed from the list sent by the server node in response to the local sensing.

Figure 13:
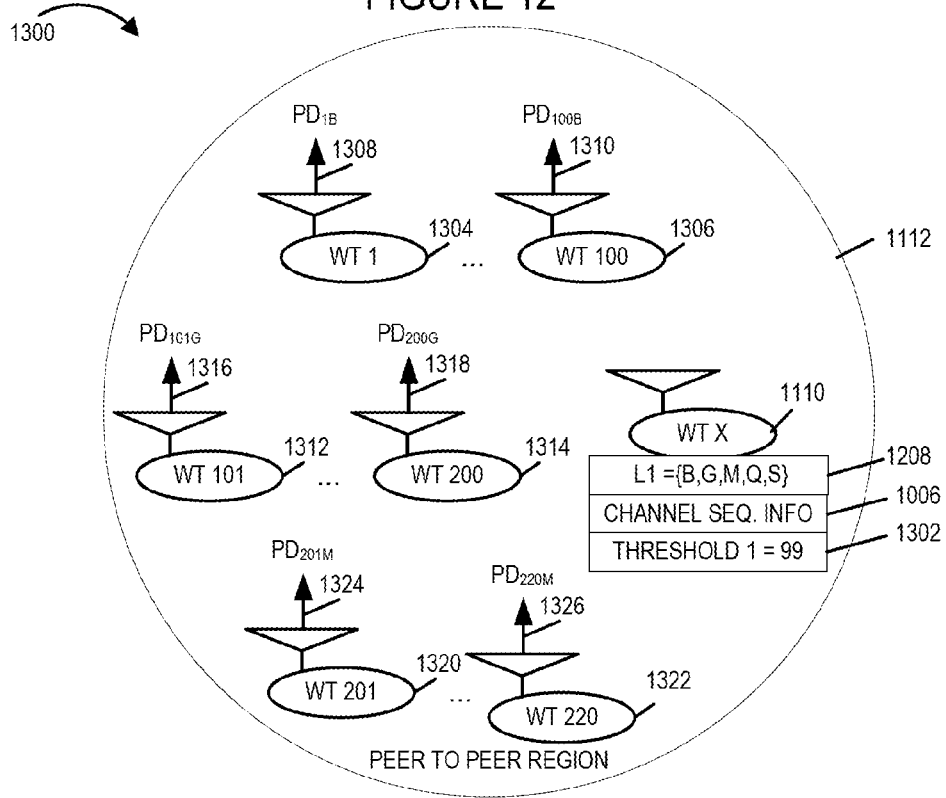
FIG. 13 is a drawing indicating that an exemplary wireless terminal monitors and counts peer to peer signals from other wireless terminals, e.g., in accordance with an exemplary method.

FIG. 13 is a drawing 1300 indicating that wireless terminal X 1110 monitors and counts peer to peer signals from other wireless terminals, e.g., in accordance with the method of flowchart 200 of FIG. 2 and flowchart 800 of FIG. 8. Wireless terminal X 1110 includes List L1 1208, channel sequence information 1006 and information 1302 indicating that Threshold 1=99.

In this example, there are 100 devices (WT 1 1304, . . . , WT 100 1306) transmitting peer discovery signals using channel B ($PD_{1B}$ 1308, . . . , $PD_{100B}$ 1310), respectively. The counted number of devices=100, exceeds threshold 1, so wireless terminal X 1110 proceeds to the next channel in the ordered sequence. In this example, there are 100 devices (WT 101 1312, . . . , WT 200 1314) transmitting peer discovery signals using channel G ($PD_{101G}$ 1316, . . . , $PD_{200G}$ 1318), respectively. The counted number of devices=100, exceed threshold 1, so wireless terminal X 1110 proceeds to the next channel in the ordered sequence.

Figure 14:
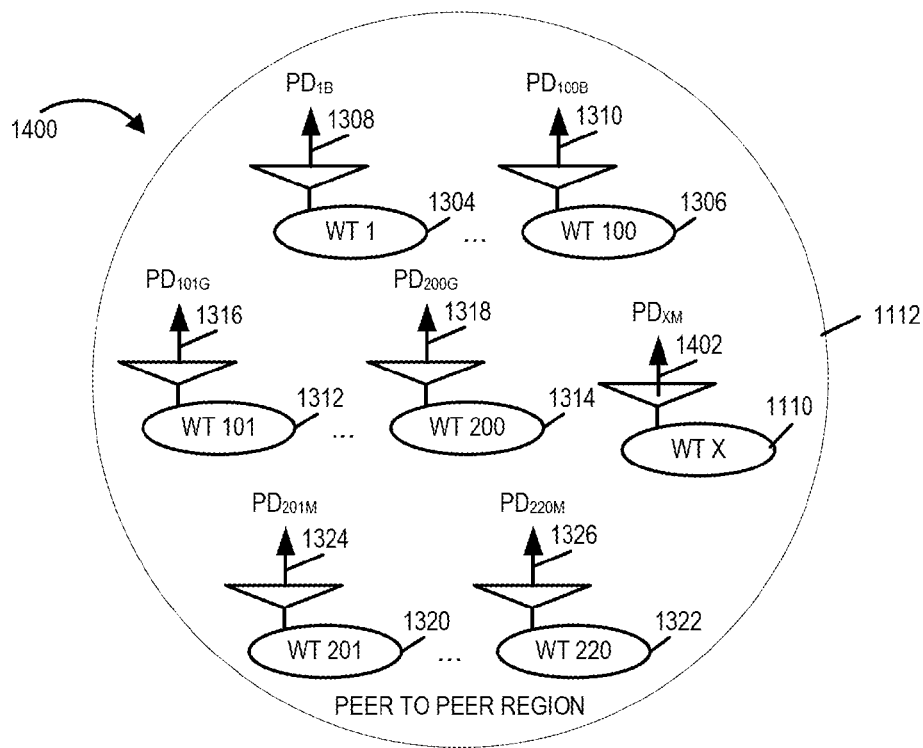
FIG. 14 is a drawing illustrating that an exemplary wireless terminal has decided to use channel M and is transmitting its peer discovery signal using channel M.

In this example, there are 20 devices (WT 201 1320, . . . , WT 220 1322) transmitting peer discovery signals using channel M ($PD_{201M}$ 1324, . . . , $PD_{220M}$ 1326), respectively. The counted number of devices=20, does not exceed threshold 1, so wireless terminal X 1110 decides to use channel M for peer to peer transmission signaling. FIG. 14 is a drawing 1400 illustrating that wireless terminal X 1110 is transmitting its peer discovery signal $PD_{XM}$ 1402 using channel M.

Figure 15:
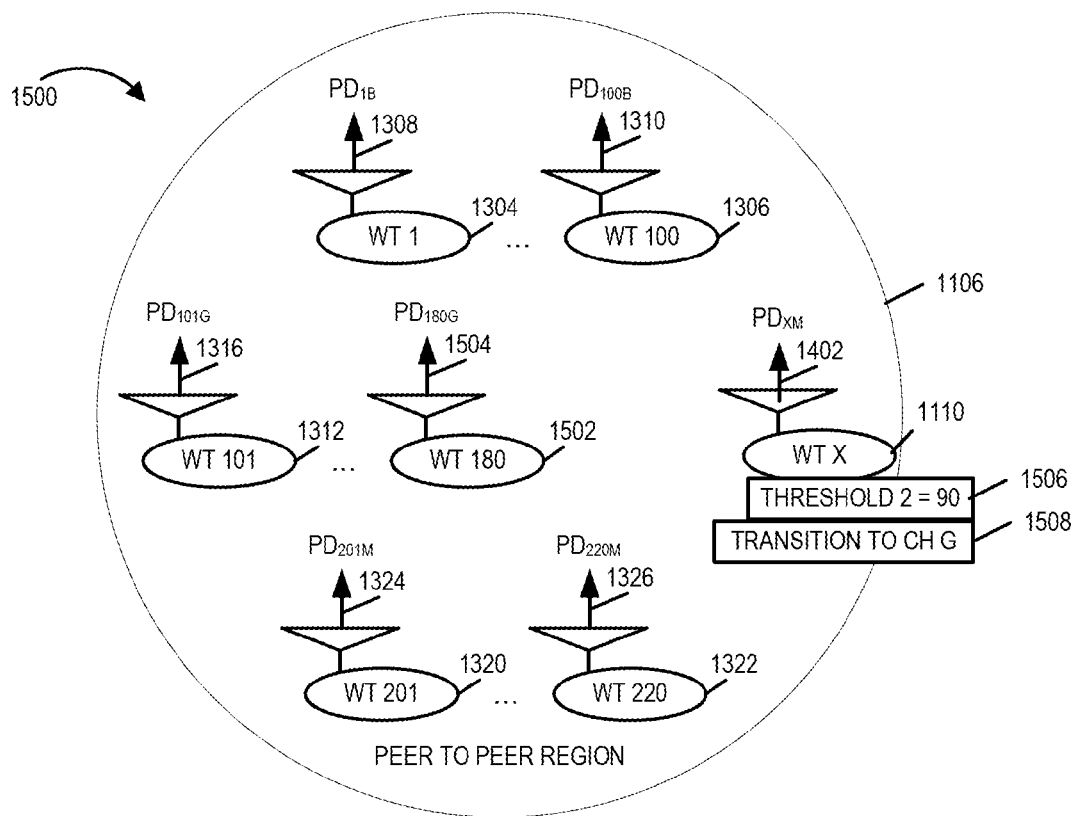
FIG. 15 is a drawing illustrating that the exemplary wireless terminal monitors lower ordered sequence channels for changes in peer device usage, and makes change switching decisions as a function of detected changes.

FIG. 15 is a drawing 1500 illustrating a time later than the time corresponding to FIG. 14, in which conditions have changed. At this time, 80 devices (WT 101 1312, . . . , WT 180 1502) are transmitting peer discovery signals ($PD_{101G}$ 1316, . . . $PD_{180G}$ 1504) using channel G. Thus, 20 devices have stopped using channel G for peer to peer signaling in region 1112 since the situation of FIG. 14, e.g., the 20 devices have powered down and/or moved to another area. Assume that wireless terminal X 1110 is the first device to sense this change in loading on channel G. WT X 1110 includes a threshold 2 value 1506 equal to 90, used for determining whether or not to switch to a lower ordered channel in the sequence. Since now, wireless terminal X 1110 counts that there are 80 wireless terminals using channel G, and 80 is less than threshold 2, wireless terminal X 1110 decides to transition to channel G as indicated by box 1508.

Figure 16:
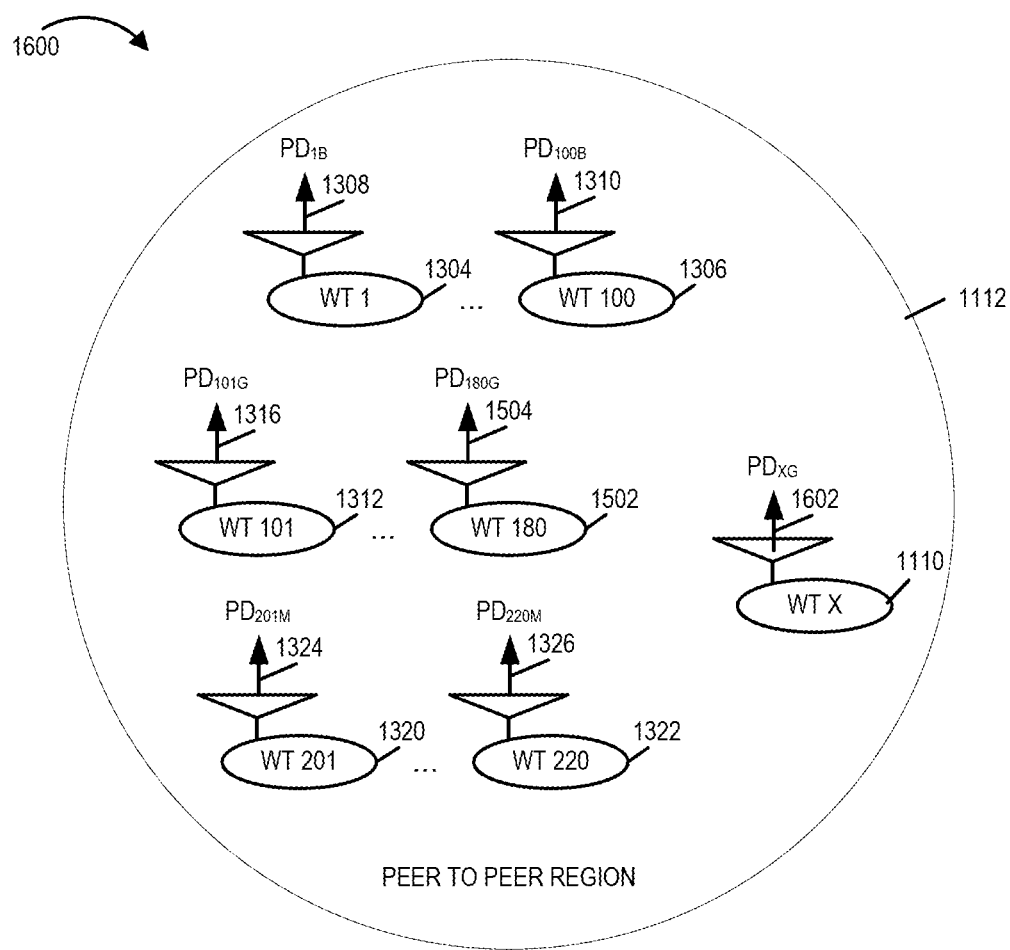
FIG. 16 is a drawing illustrating that the exemplary wireless terminal has switched from using channel M to channel G for transmitting its peer to peer signals.

FIG. 16 is a drawing illustrating that wireless terminal X 1110 is transmitting its peer discovery signal $PD_{XG}$ 1602 using channel G. Some of the other wireless terminal using channel M will also transition to channel G, e.g., in accordance with the threshold 2 switching limit.

Various aspects and/or features of some, but not necessarily all embodiments, will be described below. In some embodiments, there are potentially multiple available channels at a particular location which may be used for peer to peer communications, but no centralized entity to coordinate usage of various available channels at the location. In some embodiments, it is desirable if the wireless terminals are concentrated so as to occupy some small fixed set of channels of the multiple available channels at a location. If the wireless terminals participating in peer to peer signaling at a location are concentrated on a small fixed set of channels, it is easier for wireless terminals to discover one another. However, it may not be desirable to have too many wireless terminals on a single channel, e.g., on a single frequency band, as having to discovery each of the devices in that case becomes difficult and/or a single channel may become overloaded limiting communications. In various embodiments, wireless terminals dynamically and/or in a distributed manner determine the channels that should be using for peer to peer signaling, e.g., for transmitting and/or for receiving peer to peer signals including peer discovery signals.

In one exemplary embodiment, a wireless terminal (WT) finds an available channel which may be used for peer to peer communications. For example, in some embodiments, wireless terminals initially operate on a first band, e.g., legacy band. As the number of peers increases, the first band might be congested, and then some of wireless terminals in the first band need to migrate to new channels, e.g., channels corresponding to different bands. We assume use of a predefined logical order of channels. This predefined order could be a function of time.

Figure 17:
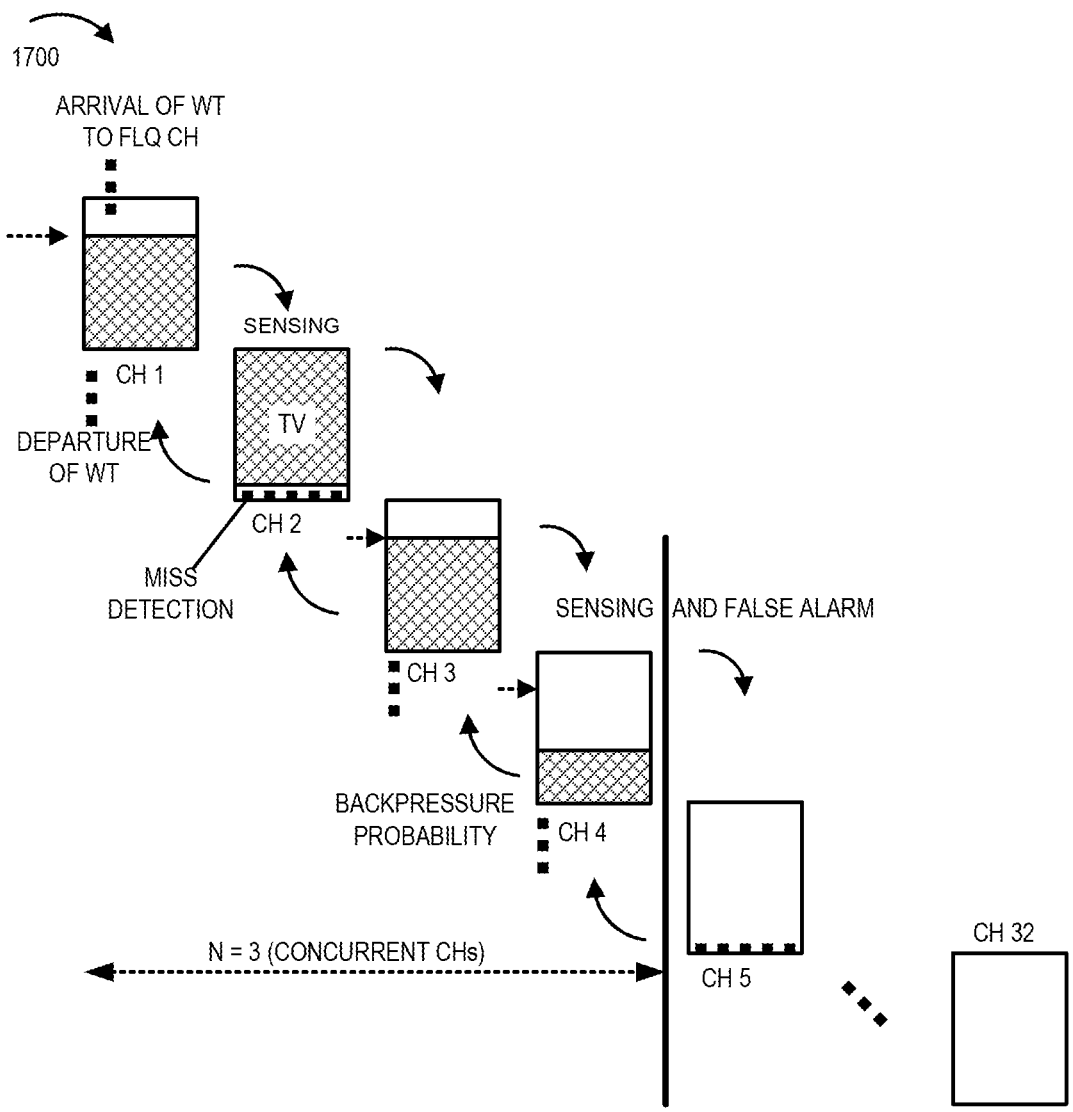
FIG. 17 is a drawing illustrating a waterfall approach used in some embodiments.

When the number of wireless terminals in the first band reaches a "migration threshold", the wireless terminals entering the network do not stay in the first band (say CH1) and migrate to next logical channel. Then, the WT performs spectrum sensing on the CH2. If the WT finds out that CH2 is available (i.e., no TV or wireless microphone signal), it then performs peer discovery in CH2. If the total number of peers is less then the migration threshold, it grabs the channel and stays there. If the WT finds out that CH2 is not available or the number of peers in CH2 exceeds the migration threshold, it proceeds to the next channel, and then does the same operation until it finds an available channel. This operation is called waterfall approach, as shown in drawing 1700 of FIG. 17, because it sequentially fills the channels and finally finds the channel to use.

Sometimes the WT goes back to a previous channel. This operation is called "move back". Move back happens if the total number of peers in that band is less than some threshold, e.g., a minimum peer number threshold. Move back happens with what can be described as backpressure probability. Move back serves two purposes. First, it can solve a possible miss detection problem. Suppose that CH2 is already occupied by a TV station. However, consider that the WT fails to detect it and regards CH2 as available and stays there. However, because CH2 is not white space, the WT cannot find his peers there. Hence, if the total number of peers is less than "minimum peer number threshold", it moves back to the previous channel and does the same operation.

Second, it also helps with possible false alarms. Suppose that CH4 is the last channel and is available. However, when the WT scans this channel, a false alarm happens and the WT thinks CH4 is occupied by a TV station, and proceeds to CH5 and finally stays there. However, it should not stay in CH5 and should go back to the previous channel. Since the WT cannot find enough number of peers in CH5, it will go back to CH4 with some probability. The two kinds of move back operations discussed above allow a wireless terminal to recover from a miss detection and a false alarm, and also keep the total number of channels in use as small as possible. Note that the system is dynamic and thus the number of WNs in each channel dynamically changes.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a wireless terminal, comprising:
generating a list of available channels for use in transmitting signals, said list of available channels being a subset of a list of possibly available channels arranged in a predetermined order known to said wireless terminal, channels in said list of available channels forming a sequence of channels, said sequence of channels including a first channel, ordering of channels in said list of available channels being said predetermined order known to said wireless terminal;
determining a number of peer devices using said first channel;
comparing the number of peer devices using said first channel to a first threshold; and
when said comparing indicates that the number of peer devices using the first channel is less than or equal to said first threshold, using said first channel for transmission purposes.

2. The method of claim 1, further comprising:
when said comparing indicates that the number of peer devices using said first channel is greater than said first threshold, checking a next channel on said list of available channels to determine if the next channel should be used for transmission purposes.

3. The method of claim 2, wherein checking the next channel in said list of available channels includes:
determining a number of peer devices using said next channel; and
comparing the number of peer devices using said next channel to said first threshold.

4. The method of claim 3, further comprising:
when said comparing the number of peer devices using said next channel to said first threshold indicates that the number of peer devices using the next channel is less than or equal to said first threshold, using said next channel for transmission purposes.

5. The method of claim 4, further comprising, when said comparing the number of peer devices using said next channel to said first threshold indicates that the number of peer devices using said next channel is greater than said first threshold, checking an additional channel on said list of available channels to determine if the additional channel should be used for transmission purposes.

6. The method of claim 2, further comprising:
determining the number of devices using said first channel, and if said number of devices using said first channel is below a second threshold, switching to said first channel for transmission purposes if a different channel is being used for transmission purposes.

7. The method of claim 1, wherein said predetermined order is based on channel frequency.

8. The method of claim 7, wherein said predetermined order includes ordering channels from one of lowest channel frequency to highest channel frequency or highest channel frequency to lowest channel frequency.

9. The method of claim 1,
wherein said predetermined order is the same at different locations of a communications system in which said wireless terminal operates; and
wherein different sets of channels are available at, at least some, different locations in said system.

10. The method of claim 1,
wherein generating said list of available channels includes:
monitoring one or more possibly available channels to identify one or more of the possibly available channels which are actually available; and
wherein said predetermined channel ordering is determined prior to said monitoring.

11. The method of claim 1, wherein generating a list of available channels for use in transmitting signals includes:
checking a database to identify possibly available channels corresponding to the location of said wireless terminal; and
monitoring one or more possibly available channels to identify one or more of the possibly available channels which are actually available.

12. The method of claim 1, further comprising:
generating a list of channels to be monitored; and
monitoring channels on said list of channels to be monitored.

13. The method of claim 12, wherein generating a list of channels to be monitored includes:
determining a list of channels to be considered for monitoring, said list including at least the channels on the list of available channels for use in transmitting signals.

14. The method of claim 13, wherein generating a list of channels to be monitored further comprises:
determining a number of peer devices using a first channel on said list of channels to be considered for monitoring; and
comparing the number of peer devices using said first channel on said list of channels to be considered for monitoring to a third threshold; and
when said comparing the number of peer devices using said first channel on said list of channels to be considered for monitoring to a third threshold indicates that the number of peer devices using the first channel on said list of channels to be considered for monitoring is greater than said third threshold, adding said first channel on said list of channels to be considered for monitoring to said list of channels to be monitored.

15. The method of claim 14, wherein generating a list of channels to be monitored further comprises:
when said comparing the number of peer devices using said first channel on said list of channels to be considered for monitoring to a third threshold indicates that the number of peer devices using the first channel on said list of channels to be considered for monitoring is less than or equal to said third threshold, proceeding to determine if a next channel on said list of channels to be considered for monitoring should be added to said list of channels to be monitored without including said first channel on said list of channels to be monitored.

16. The method of claim 15, wherein generating a list of channels to be monitored further comprises:
when said comparing the number of peer devices using said first channel on said list of channels to be considered for monitoring to a third threshold indicates that the number of peer devices using the first channel on said list of channels to be considered for monitoring is less than or equal to said third threshold:
determining if said first channel on said list of channels to be considered for monitoring is also on said list of available channels for use in transmitting signals; and
incrementing a count value used to determine when to stop checking for additional channels to be added to said list of channels to be monitored when it is determined that said first channel on said list of channels to be considered for monitoring is also on said list of available channels for use in transmitting signals.

17. The method of claim 16, wherein generating a list of channels to be monitored further comprises:
determining a number of peer devices using a second channel on said list of channels to be considered for monitoring; and
comparing the number of peer devices using said second channel on said list of channels to be considered for monitoring to said third threshold; and
when said comparing indicates that the number of peer devices using the second channel on said list of channels to be considered for monitoring is greater than said third threshold, adding said second channel on said list of channels to be considered for monitoring to said list of channels to be monitored.

18. The method of claim 1, wherein said list of available channels includes fewer channels than said list of possibly available channels.

19. A wireless terminal, comprising:
means for generating a list of available channels for use in transmitting signals, said list of available channels being a subset of a list of possibly available channels arranged in a predetermined order known to said wireless terminal, channels in said list of available channels forming a sequence of channels, said sequence of channels including a first channel, ordering of channels in said list of available channels being said predetermined order known to said wireless terminal;
means for determining a number of peer devices using said first channel;
means for comparing the number of peer devices using said first channel to a first threshold; and
means for using said first channel for transmission purposes, when said comparing indicates that the number of peer devices using the first channel is less than or equal to said first threshold.

20. The wireless terminal of claim 19, further comprising:
means for checking a next channel on said list of available channels to determine if the next channel should be used for transmission purposes, when said comparing indicates that the number of peer devices using said first channel is greater than said first threshold.

21. The wireless terminal of claim 20, wherein said means for checking the next channel in said list of available channels includes:

means for determining a number of peer devices using said next channel; and means comparing the number of peer devices using said next channel to said first threshold.

22. The wireless terminal of claim 21, further comprising:

means for using said next channel for transmission purposes, when said comparing the number of peer devices using said next channel indicates that the number of peer devices using the next channel is less than or equal to said first threshold.

23. A computer program product for use in a wireless terminal, the computer program product comprising:

a non-transitory machine-accessible medium comprising:

code for causing at least one computer to generate a list of available channels for use in transmitting signals, said list of available channels being a subset of a list of possibly available channels arranged in a predetermined order known to said wireless terminal, channels in said list of available channels forming a sequence of channels, said sequence of channels including a first channel, ordering of channels in said list of available channels being said predetermined order known to said wireless terminal;

code for causing said at least one computer to determine a number of peer devices using said first channel;

code for causing said at least one computer to compare the number of peer devices using said first channel to a first threshold; and code for causing said at least one computer to using said first channel for transmission purposes, when said comparing indicates that the number of peer devices using the first channel is less than or equal to said first threshold.

24. A wireless terminal comprising:

at least one processor configured to:

generate a list of available channels for use in transmitting signals, said list of available channels being a subset of a list of possibly available channels arranged in a predetermined order known to said wireless terminal, channels in said list of available channels forming a sequence of channels, said sequence of channels including a first channel, ordering of channels in said list of available channels being said predetermined order known to said wireless terminal;

determine a number of peer devices using said first channel;

compare the number of peer devices using said first channel to a first threshold; and use said first channel for transmission purposes when said comparing indicates that the number of peer devices using the first channel is less than or equal to said first threshold; and memory coupled to said at least one processor.

25. The wireless terminal of claim 24, wherein said at least one processor is further configured to:

check a next channel on said list of available channels to determine if the next channel should be used for transmission purposes, when said comparing indicates that the number of peer devices using said first channel is greater than said first threshold.

26. The wireless terminal of claim 25, wherein said at least one processor is further configured to:

determine a number of peer devices using said next channel; and compare the number of peer devices using said next channel to said first threshold, as part of being configured to check the next channel in said list of available channels.

27. The wireless terminal of claim 26, wherein said at least one processor is further configured to:

use said next channel for transmission purposes, when said comparing the number of peer devices using said next channel to said first threshold indicates that the number of peer devices using the next channel is less than or equal to said first threshold.

* * * * *